United States Patent
Komatsu et al.

(10) Patent No.: US 6,776,449 B2
(45) Date of Patent: Aug. 17, 2004

(54) DOOR FOR VEHICLE AND ITS MANUFACTURING METHOD

(75) Inventors: Hiroyuki Komatsu, Akishima (JP); Yutaka Miyamoto, Akishima (JP); Takao Minagawa, Akishima (JP); Hisao Hoshino, Akishima (JP)

(73) Assignee: Kikuchi Co., Ltd., Akishima (JP)

( * ) Notice: Subject to any disclaimer, the term of this patent is extended or adjusted under 35 U.S.C. 154(b) by 0 days.

(21) Appl. No.: 10/258,831

(22) PCT Filed: Mar. 8, 2002

(86) PCT No.: PCT/JP02/02180

§ 371 (c)(1),
(2), (4) Date: Oct. 28, 2002

(87) PCT Pub. No.: WO02/072373

PCT Pub. Date: Sep. 19, 2002

(65) Prior Publication Data

US 2003/0107235 A1 Jun. 12, 2003

(30) Foreign Application Priority Data

Mar. 13, 2001 (JP) ........................................ 2001-070161
Jul. 6, 2001 (JP) ........................................ 2001-206441

(51) Int. Cl.[7] .................................................. B06J 5/10
(52) U.S. Cl. ............................... 296/146.5; 296/146.6; 296/146.8; 296/147
(58) Field of Search ........................... 296/189.03, 191, 296/50, 56, 146.1, 146.5, 146.6, 146.9, 146.8, 147; 49/502

(56) References Cited

U.S. PATENT DOCUMENTS

| | | | | |
|---|---|---|---|---|
| 4,800,638 A | * | 1/1989 | Herringshaw et al. | ........ 49/502 |
| 4,843,762 A | * | 7/1989 | Grier et al. | ........ 49/502 |
| 5,581,947 A | * | 12/1996 | Kowall et al. | ........ 49/502 |
| 5,857,732 A | * | 1/1999 | Ritchie | ........ 296/146.5 |
| 5,906,073 A | | 5/1999 | Hori | |
| 6,053,562 A | * | 4/2000 | Bednarski | ........ 296/146.5 |
| 6,176,542 B1 | * | 1/2001 | Gooding et al. | ........ 296/146.6 |
| 6,241,307 B1 | * | 6/2001 | Kim | ........ 296/146.8 |
| 6,474,721 B2 | * | 11/2002 | Nishikawa et al. | ........ 296/146.6 |
| 6,508,035 B1 | * | 1/2003 | Seksaria et al. | ........ 40/502 |

FOREIGN PATENT DOCUMENTS

| | | | | |
|---|---|---|---|---|
| JP | 56-112316 A | | 9/1981 | |
| JP | 483895 A1 | * | 5/1992 | ........ 296/146.11 |
| JP | 405178090 A | * | 7/1993 | ........ 296/146.5 |
| JP | 405286364 A | * | 11/1993 | ........ 296/146.6 |
| JP | 07-040225 | | 7/1995 | |
| JP | 08-142676 | | 6/1996 | |
| JP | 10-100684 A | | 4/1998 | |
| JP | 10-217767 A | | 8/1998 | |
| JP | 2001-080361 | | 3/2001 | |

* cited by examiner

Primary Examiner—D. Glenn Dayoan
Assistant Examiner—H. Gutman
(74) Attorney, Agent, or Firm—Flynn Thiel, Boutell & Tanis, P.C.

(57) ABSTRACT

A vehicle door which can be used as a tailgate or a side door of a vehicle and a manufacturing method of this vehicle door is provided. A tailgate (1) which is a vehicle door is formed of an outer panel (2) on an outer side of a vehicle, an inner panel (3) on an inner side of the vehicle, and a module plate (4) to which door parts such as a wiper motor (18) are attached, and a lining (6). The inner panel (3) is in a frame shape with only a marginal portion (10) of the whole periphery left and with an opening (11) formed therein, which results in reduction in the weight of the tailgate (1). The module plate (4) which also serves as a reinforcing member is composed of a first extending portion (13) extending in a right and left direction and a second extending portion (14) extending downward from the first extending portion (13) to be in a substantially T-shape, which also results in reduction in the weight of the module plate (4), and connection of the module plate (4) to the outer panel (2) and the inner panel (3) reinforces the tailgate (1).

13 Claims, 19 Drawing Sheets

F I G. 1
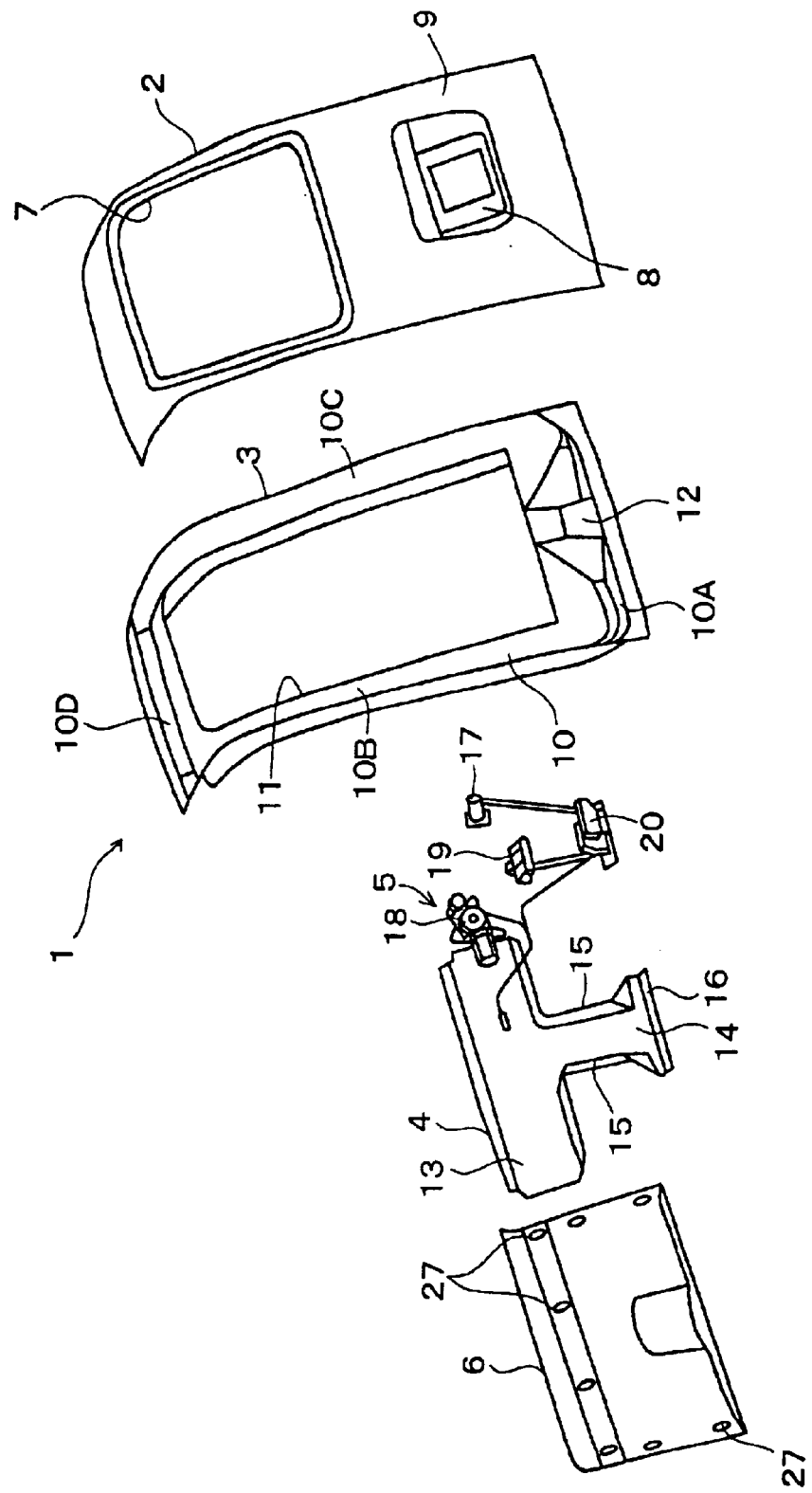

F I G. 3
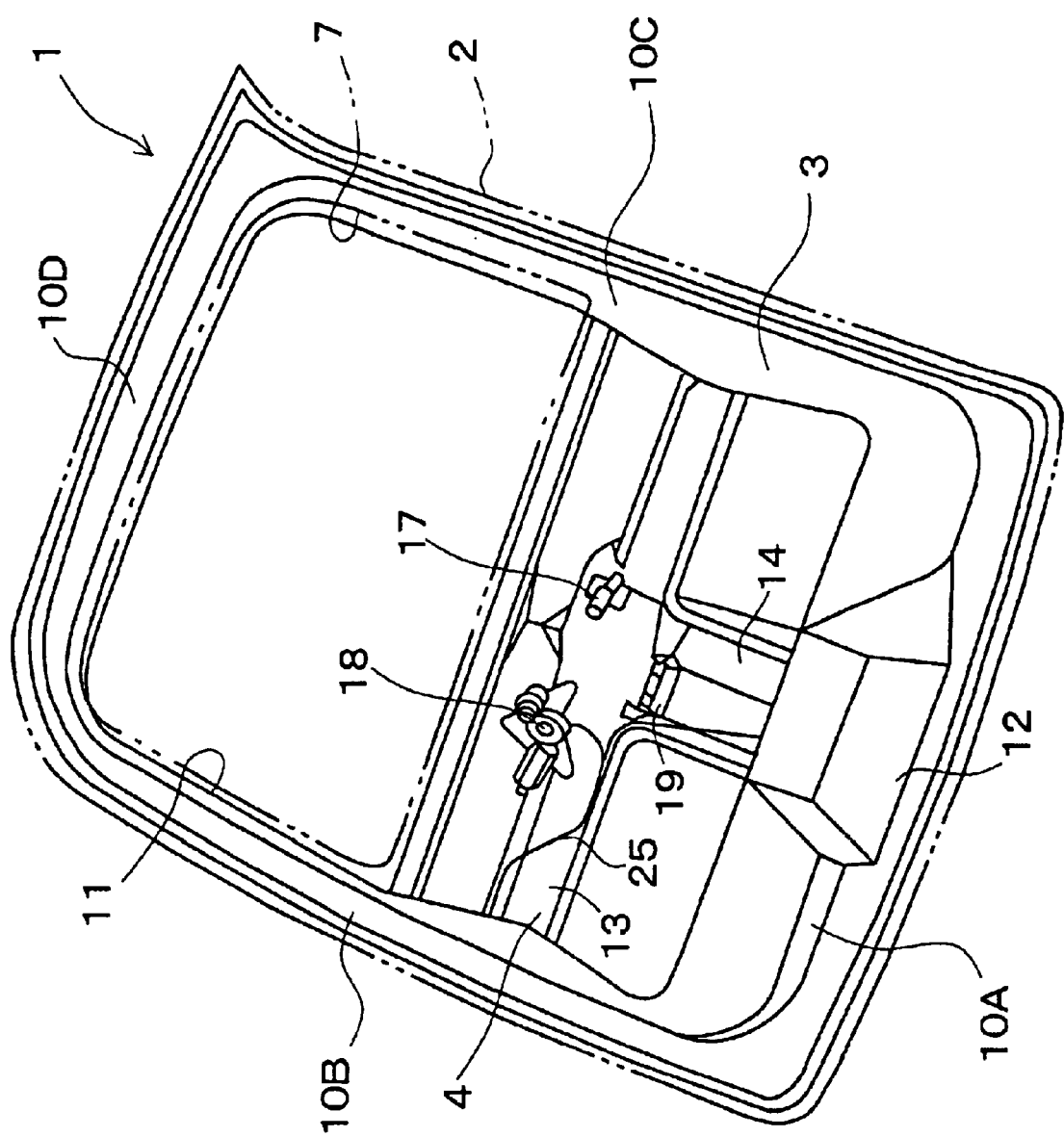

DOOR FOR VEHICLE AND ITS MANUFACTURING METHOD

TECHNICAL FIELD

The present invention relates to a vehicle door and the manufacture thereof, and is usable, for example, as a tailgate, which is also called a back door, and a side, door of a vehicle.

BACKGROUND ART

A tailgate which is a back door of a four-wheel vehicle is formed by connecting an outer panel on an outer side of the vehicle and an inner panel on an inner side of the vehicle to each other and by assembling door parts such as a door lock and a key cylinder between these outer and inner panels.

In a tailgate in Japanese Patent Laid-open No. Hei 8-142676, an inner panel is formed in a shape having an upper opening portion corresponding to a window cavity formed in an outer panel and a lower opening portion separated by a partitioning portion extending in a right and left direction relative to this upper opening portion, and a module plate in a substantially square shape which has a size large enough to cover this lower opening portion and to which door parts are attached in advance is fitted in the lower opening portion.

At present, a decrease in vehicle weight is being demanded in order to improve the fuel efficiency of a vehicle. Since a tailgate is a part of a vehicle, this tailgate influences the vehicle weight, but in the tailgate in the aforesaid conventional art, a sufficient measure is not taken for a weight decrease.

An object of the present invention is to provide a vehicle door which can realize a decrease in door weight and contribute to a decrease in vehicle weight and to provide a method of manufacturing the vehicle door.

DISCLOSURE OF THE INVENTION

A vehicle door according to the present invention is a vehicle door composed of an outer panel on an outer side of a vehicle and an inner panel on an inner side of the vehicle which is connected to this outer panel, and it is characterized in that the aforesaid inner panel is in a frame shape, with only a marginal portion of the whole periphery left and with an opening portion formed therein.

According to this vehicle door, since the inner panel is in a frame shape with only the marginal portion of the whole periphery left and with the opening portion formed therein, there is no partitioning portion for partitioning the opening portion into upper and lower portions, so that the weight of the inner panel is reduced accordingly. Consequently, the total weight of the door is reduced, which can contribute to a decrease in weight of the vehicle to which this door is attached.

In the vehicle door as described above, a reinforcing member for enhancing the strength of this inner panel and securing a required door strength is disposed. This reinforcing member may be in any shape such as a substantially square shape, but it is preferable that it includes at least a first extending portion extending in a right and left direction and a second extending portion extending downward from the center or a substantially central part in the right and left direction of this first extending portion, and that the first extending portion extends between right and left marginal portions of the inner panel.

According to this, the reinforcing member is formed of the first extending portion and the second extending portion to be in a T-shape or a substantially T-shape or is formed only of the first extending portion to be in a long and narrow shape which is long in the right and left direction, so that in either case, its area is smaller than that in a substantially square shape to reduce the weight of the reinforcing member and contribute to a reduction in door weight. Furthermore, the first extending portion extends between the right and left marginal portions of the inner panel to reinforce the inner panel and enhance the strength of the door.

When the reinforcing member is formed of the first extending portion and the second extending portion to be in a T-shape or a substantially T-shape, end portions in a longitudinal direction of the first extending portion are joined to the right and left marginal portions of the inner panel respectively and a lower end portion of the second extending portion is joined to a lower marginal portion of the aforesaid inner panel.

When the reinforcing member is formed of the first extending portion and the second extending portion is in a T-shape or a substantially T-shape as described above, this reinforcing member may be simply formed to have a planar structure, but it is preferable that ribs having a rising amount toward the outer side of the vehicle are formed in a lower part of the first extending portion and right and left side parts of the second extending portion and that the rib in the lower part of the first extending portion and the rib in the left side part of the second extending portion are continuously formed and the rib in the lower part of the first extending portion and the rib in the right side part of the second extending portion are continuously formed.

According to this, these ribs enhance the strength of the reinforcing member, and the continuous formation of these ribs along the first extending portion and the second extending portion which are perpendicular or substantially perpendicular to each other enables two-dimensional reinforcement of the whole surface of the vehicle door by the reinforcing member.

When the reinforcing member is formed only of the first extending portion to be in a long and narrow shape which is long in the right and left directions, the end portions in the longitudinal direction of this first extending portion are joined to the right and left marginal portions of the inner panel respectively.

This reinforcing member may also be simply structured to have a planar structure when the reinforcing member is formed only of the first extending portion to be a long and narrow shape which is long in the right and left direction as described above, but it is preferable that this reinforcing member is a bent member having a web whose width direction corresponds to a vertical direction and a flange bending from at least one of upper and lower edge portions of this web.

This enhances the strength of the reinforcing member itself so that the strength of the door can be increased.

Furthermore, when the reinforcing member is a bent member having a web whose width direction corresponds to the vertical direction and a flange bending from this web, the number of flanges provided may be one to form the reinforcing member in an angled shape, but it is preferable that the flanges are provided both along the upper and lower edges of the web and that these two flanges are formed continuously along the longitudinal direction of the aforesaid web.

According to this, the aforesaid reinforcing member formed of the web and the two flanges to be a bent member with a substantially C-shaped cross section becomes a channel shape, so that the two flanges sufficiently increase the strength of the reinforcing member, and furthermore, unlike the case when the reinforcing member is formed of the aforesaid first extending portion and the aforesaid second extending portion to be in a T-shape or a substantially T-shape, the lower flange can be continuously formed, similarly to the upper flange, without ending halfway in the longitudinal direction of the web. Consequently, the strength given by the upper and lower flanges is maintained as it is and the strength of the inner panel reinforced by the reinforcing member and the strength of the door can be increased sufficiently.

Furthermore, when the reinforcing member is composed of the web and the two flanges to be the bent member with the substantially C-shaped cross section, an opening portion of the reinforcing member having the substantially C-shaped cross section faces the outer side of the vehicle and each of the end portions in the longitudinal direction of the reinforcing member is joined to the surface of the inner panel on the inner side of the vehicle.

According to this, the two flanges face the outer side of the vehicle and these flanges are in the state of being accommodated in a space for securing the thickness of the door, so that the thickness of the door can be suppressed to be a predetermined size.

Door parts which are to be assembled onto the vehicle door in plurality may be attached to the reinforcing member, the inner panel, or both of the reinforcing member and the inner panel. When all or a part of the door parts are attached to the reinforcing member, the reinforcing member can be also used as an attaching member to which the door parts are attached, so that one member can serve for plural purposes.

Furthermore, when the door parts are attached to the reinforcing member before this reinforcing member is attached to the inner panel, thereby causing this reinforcing member to be a module member to which the door parts are attached in advance, the attachment of the reinforcing member to the inner panel results in the assembly of the door parts attached to the reinforcing member onto predetermined positions at the same time.

When the reinforcing member is formed of the aforesaid first extending portion and the aforesaid second extending portion to be in a T-shape or a substantially T-shape, with the end portions in the, longitudinal direction of the first extending portion joined to the right and left marginal portions of the inner panel respectively, and with the lower end portion of the second extending portion joined to the lower marginal portion of the aforesaid inner panel, various kinds of the door parts can be attached to places of the reinforcing member corresponding to functions of the door parts respectively, making effective use of the shape of this reinforcing member. One example of this is that, when the door parts include a key cylinder, a wiper motor, an outer handle, and a door lock, the key cylinder and the wiper motor are attached to the first extending portion, the outer handle is attached to a connecting portion of the first extending portion and the second extending portion, and the door lock is attached to the second extending portion.

Meanwhile, when the reinforcing member is formed only of the first extending portion to be in a long and narrow shape which is long in the right and left directions and the end portions in the longitudinal direction of this first extending portion are joined to the right and left marginal portions of the inner panel respectively, the wiper motor, the outer handle, and the key cylinder are attached to this reinforcing member and the door lock is attached to the inner panel.

Furthermore, when the marginal portion of the inner panel has a hat-shaped cross section, a cross section of a joining portion of the outer panel, the inner panel, and the reinforcing member can be formed in a box shape, with a peripheral portion of the outer panel joined to the surface of the marginal portion, which has the hat-shaped cross section opening toward the outer side of the vehicle, of the inner panel on the outer side of the vehicle and with the end portions of the reinforcing member joined to the surface of the marginal portion of the inner panel on the inner side of the vehicle.

This greatly strengthens the connecting portion of the outer panel, the inner panel, and the reinforcing member and can enhance the strength of the entire door.

Furthermore, the outer handle used when the door is opened/closed may be attached to the reinforcing member.

This prevents an operating force given to the outer handle from acting directly on the outer panel and causes this operating force to be received by the reinforcing member since the outer handle is not attached to the outer panel. Consequently, the problem caused when the operating force given to the outer handle directly acts on the outer panel, for example, the problem that deformation such as a partial dent occurs in the outer panel can be solved.

Furthermore, when the outer handle is attached to the reinforcing member via a bracket, a license lamp may be attached to this bracket.

This causes the bracket for attaching the outer handle to also serve as a bracket for attaching the license lamp, which can reduce the number of parts accordingly and, as a result of the reduction in the number of the parts, contribute to a weight reduction of the door.

Places of the inner panel to which the end portions of the reinforcing member are joined may be places perpendicular or substantially perpendicular to an opening/closing direction of the door, or may be places parallel or substantially parallel to the opening/closing direction of the door.

In the latter case, rising portions rising in a direction perpendicular or substantially perpendicular to the opening/closing direction of the door are formed on the inner panel in order to form a predetermined thickness of the door with a predetermined spaced interval being secured between the inner panel and the outer panel, so that the end portions of the reinforcing member can be joined to the inner panel using the rising portions. Moreover, unlike the case when the former is adopted, the inner panel can be formed in a gentle shape without an abrupt change in its shape or with a small number of portions where its shape changes abruptly, so that the occurrence of stress concentration due to impact load can be suppressed when the door is opened/closed.

Furthermore, it is preferable that a box-shaped portion having a box-shaped cross section is formed along the whole periphery of the door by forming a hat-shaped portion with a hat-shaped cross section along the whole periphery of the inner panel in the marginal portion of the inner panel and by connecting this inner panel and the outer panel to each other.

This secures the strength of the entire door owing to the box-shaped portion along the whole periphery of the door. The reinforcing member formed of the aforesaid first extending portion and the aforesaid second extending portion to be in a T-shape or a substantially T-shape or the reinforcing member formed only of the aforesaid first extending portion to be in a long and narrow shape which is long in the right and left directions is connected to the inner panel, so that the strength of the door is further increased.

The inner panel may be formed of one blank material or may be formed of a tailored blank which is formed by joining a plurality of blank materials including blank materials having different plate thickness.

When the inner panel is formed in the latter manner, demands for door strength and door weight, which are inconsistent with each other, can both be satisfied at the same time by using a blank material having a large plate thickness in a portion which requires strength.

One example of the case when the inner panel is formed in the latter manner is that the tailored blank is composed of a blank material forming a hinge attaching portion to which a door hinge is attached and a blank material forming a portion other than this hinge attaching portion, and that the blank material forming the hinge attaching portion has a plate thickness larger than the blank material forming the portion other than the hinge attaching portion.

This can secure the strength required for the hinge attaching portion owing to the blank material with a large plate thickness, and furthermore, the portion, which occupies a large area of the inner panel, other than the hinge attaching portion is formed of the blank material having a small plate thickness so that the weight of the door can be reduced.

At least a part of the portion other than the hinge attaching portion may be formed of one blank material or may be formed by joining a plurality of blank materials having the same plate thickness.

In the latter case, a material yield of the blank materials which are blanked by press work can be increased even when at least a part of the portion other than this hinge attaching portion has a complicated shape such as a shape having a bending portion.

Furthermore, in the vehicle door according to the present invention described above, the inner panel and the reinforcing member, and the outer panel and the reinforcing member may be joined to each other by welding such as spot welding or by using a connecting tool such as a bolt and a nut.

A manufacturing method of a vehicle door according to the present invention is a method of manufacturing a vehicle door by connecting an outer panel on an outer side of a vehicle, an inner panel on an inner side of the vehicle in a frame shape, with only a marginal portion of the whole periphery left and with a large opening portion formed therein, and a reinforcing member having at least a first extending portion extending in a right and left direction and a second extending portion extending downward from the central part or a substantially central part of this first extending portion, and it is characterized in that, after the work of joining each of the end portions of the aforesaid reinforcing member to a marginal portion of the aforesaid inner panel is carried out and after the work of connecting the aforesaid outer panel and the aforesaid inner panel to each other is carried out, the work of painting the aforesaid outer panel, the aforesaid inner panel, and the aforesaid reinforcing member integrally connected is carried out, and subsequently, the work of attaching door parts to the aforesaid reinforcing member and/or the aforesaid inner panel is carried out.

According to this manufacturing method, the outer panel, the inner panel, and the reinforcing member are painted after they are integrally connected, so that it becomes unnecessary to carry out the painting work for them as individual works, and consequently, workability is improved. Furthermore, even when the inner panel and the reinforcing member, and the outer panel and the reinforcing member are joined to each other by welding such as spot welding, all of the welded portions can be painted by the painting work.

In this manufacturing method, the work of assembling door parts after the work of painting the outer panel, the inner panel, and the reinforcing member may be carried out by attaching all the door parts to the inner panel or the reinforcing member, or by attaching a part of the door parts to the inner panel and the other door parts to the reinforcing member respectively.

Furthermore, a manufacturing method of a vehicle door according to the present invention is a method of manufacturing a vehicle door by connecting an outer panel on an outer side of a vehicle, an inner panel on an inner side of the vehicle in a frame shape, with only a marginal portion of the whole periphery left and with a large opening portion formed therein, and a reinforcing member having at least a first extending portion extending in a right and left direction and a second extending portion extending downward from the central part or a substantially central part of this first extending portion, and it is characterized in that the aforesaid outer panel and the aforesaid inner panel are integrally connected in advance, subsequently these outer and inner panels are painted, and thereafter the aforesaid reinforcing member to which door parts are attached is attached to the aforesaid inner panel.

According to this manufacturing method, the outer panel and the inner panel are painted after they are integrally connected to each other, so that it become unnecessary to carry out painting works for them as individual works, thereby improving workability accordingly. Moreover, the door parts are attached to the reinforcing member in advance, so that the work of assembling the door parts, which are attached to the reinforcing member, to a door is finished at the same time when the work of disposing this reinforcing member to extend between the right and left side marginal portions in the marginal portion of the inner panel is carried out, and furthermore, the work of attaching the door parts to the reinforcing member can be carried out in a place having an open surrounding space, so that workability is improved.

Incidentally, since the work of painting the outer panel and the inner panel is already finished when the work of joining the reinforcing member and the inner panel and the work of joining the reinforcing member and the outer panel in this manufacturing method are carried out, it is preferable that the work of joining the reinforcing member and the inner panel and the work of joining the reinforcing member and the outer panel are carried out by using a connecting tool such as a bolt and a nut.

Furthermore, in this manufacturing method, the door parts which are attached to the reinforcing member in advance may be all of the door parts or may be a part of the door parts.

Furthermore, the vehicle door according to the present invention described hitherto may be a tailgate or a side door.

When the vehicle door according to the present invention is a tailgate, this tailgate may be a tailgate of a vertically opening/closing type, with hinges around which the tailgate opens/closes being disposed in an upper portion thereof, or may be a tailgate of a horizontally opening/closing type, with hinges being disposed on the side parts thereof Moreover, when the vehicle door according to the present invention is a side door, it may be a side door of a hinged door type which opens/closes by hinges, or may be a side door of a sliding type which opens/closes by sliding movement.

BRIEF DESCRIPTION OF THE DRAWINGS

FIG. 1 is an exploded perspective view showing a tailgate which is a vehicle door according to one embodiment of the present invention;

FIG. 3 is a perspective view of an inner panel seen from an outer side of a vehicle, with the module plate attached thereto;

BEST MODE FOR CARRYING OUT THE INVENTION

Figure 2:
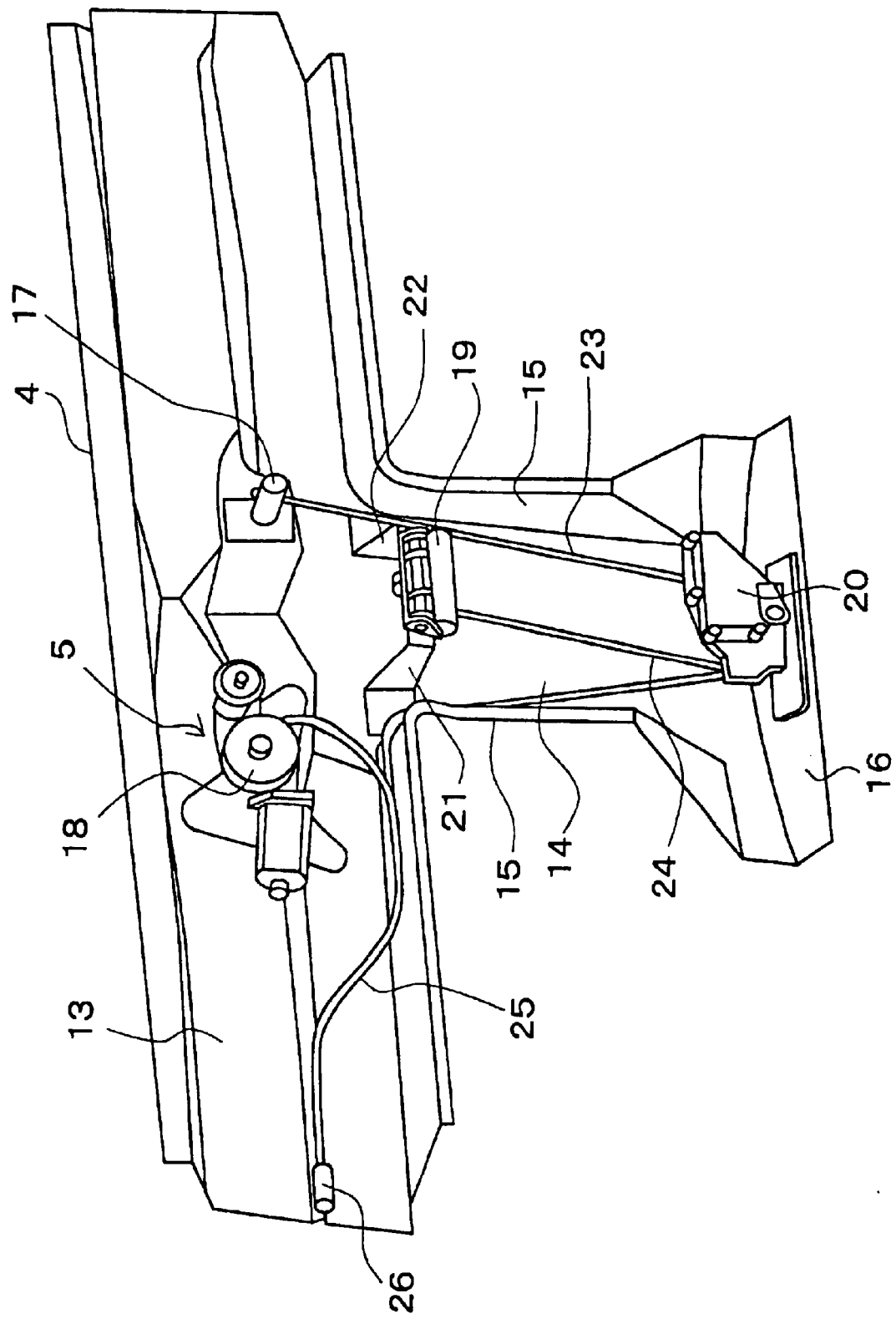
FIG. 2 is a perspective view showing the state in which door parts are attached to a module plate, which is shown in FIG. 1, serving as a reinforcing member.

In order to describe the present invention in more detail, the explanation on this will be given with reference to the attached drawings.

FIG. 1 is an exploded perspective view of a tailgate 1 which is a vehicle door according to a first embodiment of the present invention. This tailgate 1 is composed of an outer panel 2 on an outer side of a vehicle, an inner panel 3 on an inner side of the vehicle, which is connected to this outer panel 2, a module plate 4 serving as a reinforcing member, which is connected to the outer panel 2 and inner panel 3, the tailgate parts 5 which are door parts attached to a surface of this module plate 4 on the outer side of the vehicle, and a lining 6 fixed to a surface of the module plate on the inner side of the vehicle and a surface of the inner panel 3 on the inner side of the vehicle. The outer panel 2, the inner panel 3, and the module plate 4 are made of metal plates and the lining 6 is made of synthetic resin.

In a substantially upper half of the outer panel 2, a window cavity 7 in which a glass is fitted is formed, and under this, there is a shielding portion 9 having a recessed portion 8 to which a license plate is attached.

The inner panel 3, which has an entire shape and size corresponding to those of the outer panel 2, is formed by press work, blanking work, trimming work, and so on of a sheet metal, and this inner panel 3 is in a frame shape with a marginal portion 10 of the whole periphery left and with a large opening portion 11 formed therein. A substantially upper half of this opening portion 11 has a size and a shape corresponding to those of the window cavity 7 of the outer panel 2, and the opening portion 11 extends downward beyond this window cavity 7, so that its size in a vertical direction is large. Meanwhile, in the marginal portion 10 of the inner panel 3, a lower marginal portion 10A is larger in width size than right and left marginal portions 10B, 10C and an upper marginal portion 10D, and a bulging portion 12 bulging out in an outward direction of the vehicle from the inner side of the vehicle is provided in this lower marginal portion 10A.

The module plate 4 is formed by folding work, blanking work, and so on of a sheet metal and its entire shape is in a substantially T-shape. More specifically, the module plate 4 is formed of a first extending portion 13 extending in a right and left direction and a second extending portion 14 extending downward from a substantially central part of this first extending portion 13. In a lower part of the first extending portion 13 and right and left side parts of the second extending portion 14, ribs 15 having a rising amount toward the outer side of the vehicle are formed, and these two ribs 15 are continuously formed from the lower part of the first extending portion 13 to the left side part of the second extending portion 14 and from the lower part of the first extending portion 13 to the right side part of the second extending portion 14 respectively. Furthermore, in a lower part of the second extending portion 14, a standing portion 16 extending in the right and left direction and standing toward the outer side of the vehicle is formed.

The tailgate parts 5 include a key cylinder 17, a wiper motor 18, an outer handle 19, and a door lock 20. These tailgate parts 5 are attached to respective predetermined positions on a surface of the module plate 4 on the outer side of the vehicle as shown in FIG. 2. To specifically explain this, the key cylinder 17 and the wiper motor 18 are attached separately to a left portion and a right portion of the first extending portion 13 respectively, the outer handle 19 is attached to a connecting part of the first extending portion 13 and the second extending portion 14 via right and left brackets 21, 22, and the door lock 20 is attached to the standing portion 16 in the lower part of the second extending portion 14.

The key cylinder 17, the wiper motor 18, and the door lock 20 are connected to the module plate 4 with a bolt, the brackets 21, 22 are joined to the module plate 4 by spot welding, and the outer handle 19 is connected to these brackets 21, 22 with bolts and nuts.

Moreover, a rod 23 for transmitting an operational force to the door lock 20 when the key cylinder 17 is operated with a key is suspended between the key cylinder 17 and the door lock 20, and between the outer handle 19 and the door lock 20, a rod 24 for transmitting an operational force to the door lock 20 when the outer handle 19 is manually operated is also suspended. These rods 23, 24 are disposed along the second extending portion 14 extending in a vertical direction of the module plate 4.

Furthermore, in the first extending portion 13 extending in the right and left direction of the module plate 4, a harness 25 extending from a left end portion of the first extending portion 13 in FIG. 2 to the wiper motor 18 is wired, and in an end portion of this harness 25 opposite the wiper motor 18, a coupler 26 is provided.

The lining 6 shown in FIG. 1 is in a substantially square shape having a larger area than the module plate 4, so that the lining 6 can cover the entire module plate 4 from the inner side of the vehicle. Furthermore, on a surface of this lining 6 on the outer side of the vehicle, a plurality of clips 27 to be inserted into and caught by catching holes formed in the inner panel 3 and the module plate 4 are provided.

Figure 4:
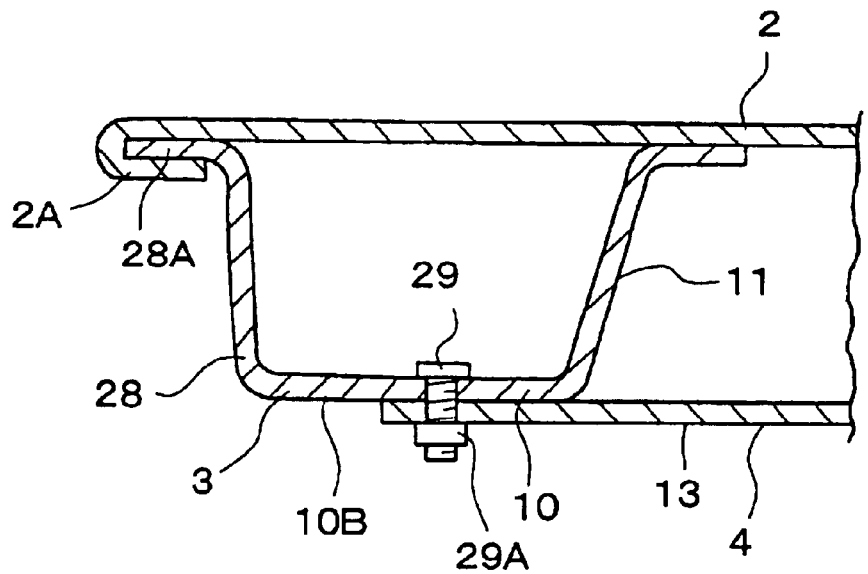
FIG. 4 is a cross sectional view showing a joining portion of an end portion of an outer panel, a hat-shaped portion of a marginal portion of the inner panel, and an end portion of the module plate.

The marginal portion 10 of the inner panel 3 has a cross section in a hat shape opening toward the outer side of the vehicle as shown in FIG. 4. This hat-shaped portion 28 is formed along the substantially entire periphery of the inner panel 3 excluding the bulging portion 12 shown in FIG. 1, namely, along the substantially entire periphery of the aforesaid opening portion 11, and in addition, the hat-shaped portion 28 in the lower marginal portion 10A, the right and left marginal portions 10B, 10C, and the upper marginal portion 10D of the inner panel 3 is formed to have the width size and height size corresponding to the width size and so on of these lower marginal portion 10A, right and left marginal portions 10B, 10C, and upper marginal portion 10D.

As shown in FIG. 4, a flange portion 28A is provided in an outer end portion of the hat-shaped portion 28, and hemming work of folding the outer end portion 2A and caulking the outer end portion 2A to this flange portion 28A is carried out, and furthermore, the outer panel 2 and the inner panel 3 are spot-welded, so that the outer panel 2 and the inner panel 3 are connected to each other. While the outer panel 2 is thus connected to the surface of the inner panel 3 on the outer side of the vehicle, in the module plate 4, the right and left end portions of the first extending portion 13 are connected to the surfaces of the right and left marginal portions 10B, 10C of the inner panel 3 on the inner side of the vehicle, and the lower end portion of the second extending portion 14 is connected to the surface of the lower marginal portion 10A of the inner panel on the inner side of the vehicle, respectively. They are connected by screwing and fastening a nut 29A to a stud bolt 29 provided in the marginal portion 10 of the inner panel 3, as shown in FIG. 4 showing the structure of joining the left end portion of the first extending portion 13 of the module plate 4 and the left marginal portion 10B of the inner panel 3 to each other. Incidentally, since the standing portion 16 is provided in the lower part of the second extending portion 14, the joining between the lower end portion of the second extending portion 14 of the module plate 4 and the lower marginal portion 10A of the inner panel 3 using the stud bolt 29 and the nut 29A is carried out in a place slightly above the standing portion 16.

Through the above-described processes, the outer panel 2, the inner panel 3, and the module plate 4 are joined to one another at three end portions of the module plate 4 in a substantially T-shape, and as shown in FIG. 4, their joining portion has a cross section in a box shape in which the peripheral portion of the outer panel 2 is connected to the surface of the marginal portion 10, whose cross section is in a hat shape opening toward the outer side of the vehicle, of the inner panel 3 on the outer side of the vehicle and in which the end portion of the module plate 4 is fixed to the surface on the inner side of the vehicle.

Figure 5:
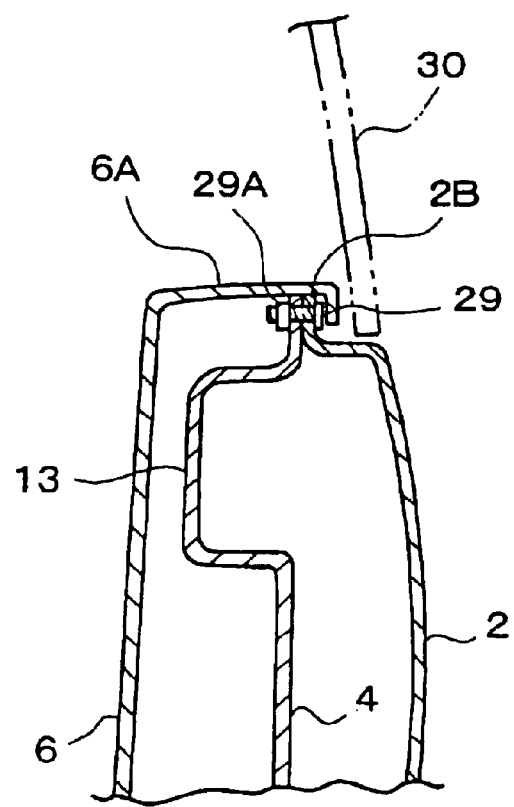
FIG. 5 is a cross sectional view showing the joining structure of an upper peripheral portion of the module plate and a lower peripheral portion of a window cavity in the outer panel, in which a glass is fitted.

FIG. 5 shows the structure of joining the upper peripheral portion of the first extending portion 13 of the module plate 4 to a lower peripheral portion 2B of the aforesaid window cavity 7 in which the glass 30 in the outer panel 2 is fitted. The stud bolt 29 is provided in the peripheral portion 2B, and the nut 29A is screwed and fastened to this stud bolt 29 so that the upper peripheral portion of the first extending portion 13 of the module plate 4 is joined to the peripheral portion 2B.

FIG. 3 is a perspective view of the inner panel 3 seen from the outer side of the vehicle after the outer panel 2, the inner panel 3, and the module plate 4 are connected together as described above, in which the outer panel 2 is shown by the two-dotted line. The module plate 4 is disposed in a portion corresponding to the substantially lower half of the large opening portion 11 which is formed in the inner panel 3 with only the marginal portion 10 of its whole periphery left, and the, module plate 4 does not protrude to the substantially upper half, which faces the window cavity 7 of the outer panel 2, of the opening portion 11. Moreover, the module plate 4 is thus disposed in and fixed to the predetermined position of the inner panel 3 and the outer panel 2, so that the key cylinder 17, the wiper motor 18, the outer handle 19, and the door lock 20 as the tailgate parts 5 attached to the module plate 4 are disposed in respective predetermined positions of the tailgate 1 composed of these outer panel 2, inner panel 3, module plate 4, and so on.

As for the arrangement positions of these tailgate parts 5, as shown in FIG. 3, the key cylinder 17, the wiper motor 18, and the outer handle 19 are disposed in positions facing the opening portion 11 of the inner panel 3, and the door lock 20 is disposed in a position corresponding to the aforesaid bulging portion 12 which is formed in the lower marginal portion 10A of the inner panel 3. Meanwhile, when the work of connecting the module plate 4 to the inner panel 3 and the outer panel 2 is carried out, the coupler 26 in the end portion of the harness 25, which is shown in FIG. 2, wired to the module plate 4 is connected to a coupler of a connecting harness which is wired in advance on the surface of the inner panel 3 on the inner side of the vehicle.

Incidentally, in the aforesaid shielding portion 9 in the outer panel 2 which corresponds to the lower part of the opening portion 11, formed are holes or opening portions whose arrangement positions relative to each other correspond to the arrangement positions of the key cylinder 17, the wiper motor 18, and the outer handle 19 relative to each other, and when the module plate 4 is disposed in the predetermined position of the inner panel 3 and the outer panel 2, the key cylinder 17, the wiper motor 18, and the outer handle 19 face these holes or opening portions to be exposed to the outer side of the vehicle.

After the module plate 4 is thus connected to the inner panel 3 and the outer panel 2, the work of attaching the lining 6 shown in FIG. 1 to the surface of the module plate 4 on the inner side of the vehicle and to the surface of the inner panel 3 on the inner side of the vehicle is carried out. This attaching work is carried out by having the aforesaid clips 27, which are provided on the lining 6, inserted into and caught by the catching holes formed in the inner panel 3 and the module plate 4. After this work of attaching the lining 6 is carried out, an upper portion 6A of the lining 6 bending toward the outer side of the vehicle hides the joining portion of the upper peripheral portion of the first extending portion 13 of the module plate 4 and the peripheral portion 2B of the outer panel 2, as shown in FIG. 5.

Furthermore, the lining 6 is in a substantially square shape having a larger area than the substantially lower half of the opening portion 11 of the inner panel 3 in which the module plate 4 is disposed, so that, when the lining 6 is attached to the predetermined position, the entire module plate 4 is covered with it on the inner side-of the vehicle and the substantially lower half of the opening 11 is hidden.

According to this embodiment described hitherto, the inner panel 3 which is a constituent member of the tailgate 1 is in a frame shape with only the marginal portion 10 of the whole periphery 10 left and with the large opening portion 11 formed therein, and is not in a shape having a partitioning portion partitioning the opening portion into upper and lower portions, which can reduce the weight of the inner panel 3 by the weight of the partitioning portion, compared with an inner panel provided with this partitioning portion. This reduces the total weight of the tailgate 1 and can contribute to the weight reduction of the vehicle to which this tailgate 1 is attached.

Moreover, the tailgate parts 5 are attached to the module plate 4 and this module plate 4 is connected to the inner panel 3 and the outer panel 2, so that, when this connecting work is carried out, the work of disposing the tailgate parts 5 in the predetermined positions of the tailgate 1 can be carried out simply and in a short time.

Moreover, the module plate 4 is composed of the first extending portion 13 extending in the right and left direction and the second extending portion 14 extending downward from the substantially central part of this first extending portion 13 to be in a substantially T-shape, so that the weight of the module plate 4 is also reduced, compared with a module plate in a substantially square shape, which makes it possible to further reduce the total weight of the tailgate 1 accordingly.

Furthermore, in the module plate 4 in a substantially T-shape, both of the end portions of the first extending portion 13 are joined to the right and left marginal portions 10B, 10C of the inner panel 3 and the lower end portion of the second extending portion 14 is joined to the lower marginal portion 10A of the inner panel 3, so that the module plate 4 is made full use of as the reinforcing member of the tailgate 1 to enable the strength of the tailgate 1 to be increased.

Furthermore, the module plate 4 is formed in a substantially T-shape, so that the places for attaching the key cylinder 17, the wiper motor 18, the outer handle 19, and the door lock 20 which should be arranged in the tailgate 1 can also be secured as places corresponding to the functions of these tailgate parts in the module plate 4, and the place for wiring the harness 25 and the places for disposing the rods 23, 24 shown in FIG. 2 can also be secured in the module plate 4.

Furthermore, the module plate 4 is formed in a three-dimensional shape provided with the two ribs 15 having the rising amount in the inner and outer direction of the vehicle, so that the strength of the module plate 4 itself can be increased, and the increase in the strength of the module plate 4 which also serves as the reinforcing member of the tailgate 1 increases the total strength of the tailgate 1.

Especially, these two ribs 15 continuously extend from the lower part of the first extending portion 13 to the left side portion of the second extending portion 14 and from the lower part of the first extending portion 13 to the right side portion of the second extending portion 14 respectively, and the ribs 15 are continuously formed along the first extending portion 13 and the second extending portion 14 which are perpendicular or substantially perpendicular to each other, so that two-dimensional reinforcement over the surface of the tailgate 1 is made possible by the module plate 4.

Furthermore, the cross section of the marginal portion 10 of the inner panel 3 is hat-shaped, with the hat-shaped portion 28 formed therein, and the cross section of the joining portion of the outer panel 2, the inner panel 3, and the module plate 4 is a box-shaped cross section in which the peripheral portion of the outer panel 3 is connected to the surface of the marginal portion 10, which is the hat-shaped portion 28 opening toward the outer side of the vehicle, of the inner panel 3 on the outer side of the vehicle, and the end portion of the module panel 4 is fixed to the surface on the inner side of the vehicle, so that their joining portion has a large strength, and as a result, the total strength of the tailgate 1 can be further enhanced.

Moreover, the outer handle 19 used when the tailgate 1 is opened/closed is attached to the module plate 4 via the brackets 21, 22, and not attached to the outer panel 2, so that the operational force given to the outer handle 19 does not act directly on the outer panel 2 and acts on the module plate 4 which also serves as the reinforcing member of the tailgate 1 via the brackets 21, 22. Consequently, the problem that deformation such as a partial dent occurs in the outer panel 2 due to the operational force given to the outer handle 19 can be solved.

Figure 6:
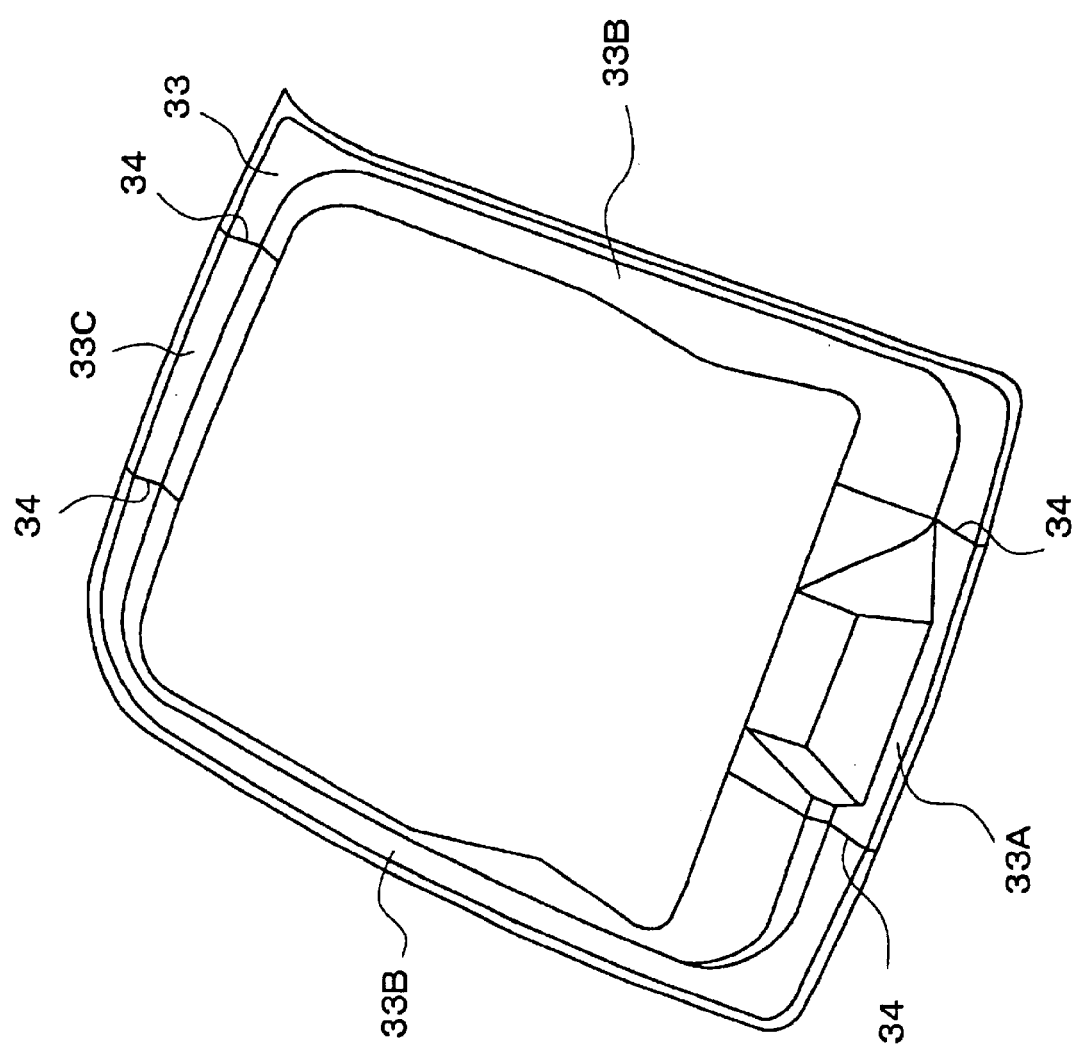
FIG. 6 is a perspective view showing an inner panel in an embodiment in which the inner panel is formed of a tailored blank.

FIG. 6 shows the inner panel 33 according to another embodiment. This inner panel 33 is made of a tailored blank which is formed by joining plate materials 33A, 33B, 33C having different thickness via a joining portion 34. In this embodiment, the plate material 33A is the thickest, the plate material 33B is next in thickness, and the plate material 33C is the thinnest. This is one example, and the number and the arrangement positions of plate materials with different thickness which are used may be determined in any manner according to the function and so on required for the inner panel. A joining means of the plate materials may be seam welding (including mash-seam welding) or spot welding.

When the inner panel is made of the tailored blank as described above, the inner panel can be formed by effectively combining plate materials having different thicknesses, so that weight reduction and securing of the strength of the inner panel can be achieved at the same time.

Figure 7:
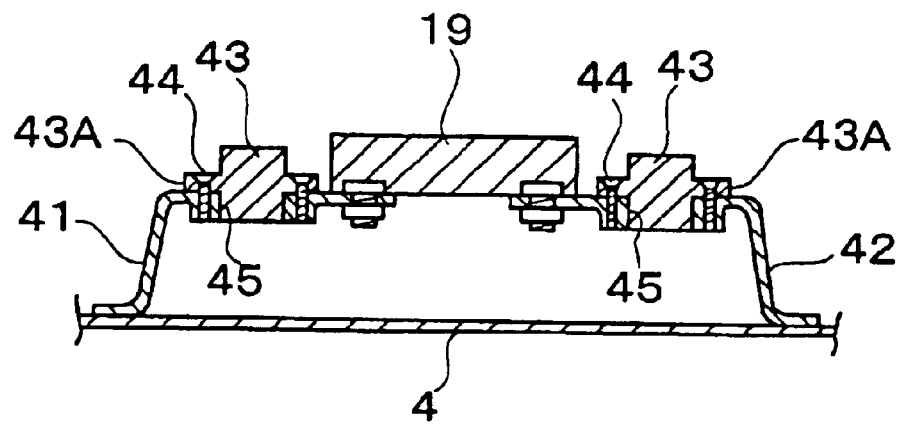
FIG. 7 is a cross sectional view showing a case where license lamps are attached to brackets for attaching an outer handle to the module plate.
Figure 8:
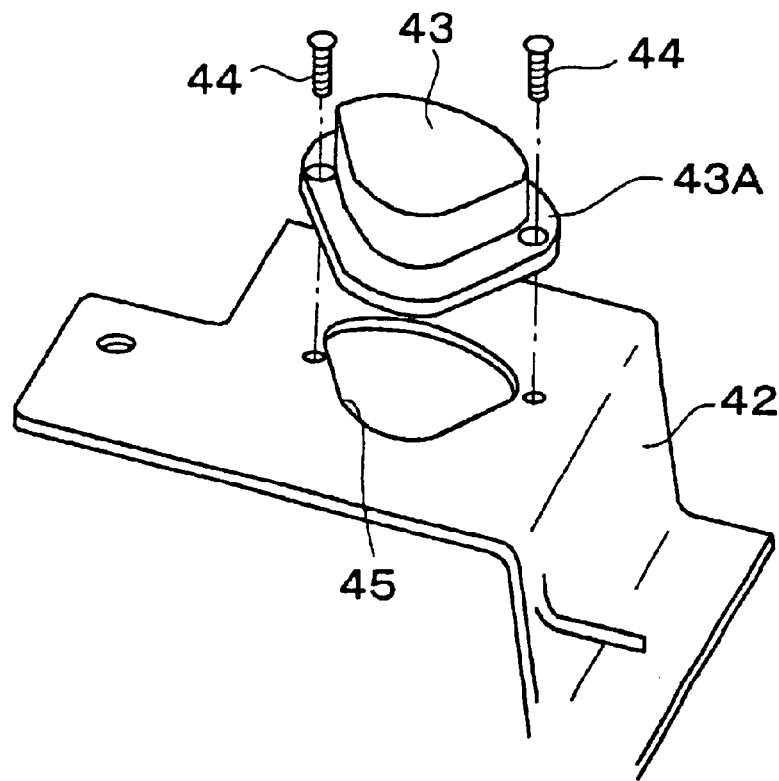
FIG. 8 is a perspective view showing the state in which the bracket and the license lamp shown in FIG. 7 are separated from each other.

FIG. 7 shows an embodiment in which license lamps 43 are attached to brackets 41, 42 via which the outer handle 19 is attached to the module plate 4. As shown in FIG. 8 which shows the bracket 42, out of the brackets 41, 42, holes 45 for inserting lower parts of the license lamps 43 therethrough are formed in the brackets 41, 42, and as shown in FIG. 7, flange portions 43A of the license lamps 43 whose lower parts are inserted into the holes 45 are connected to the brackets 41, 42 using bolts 44, so that the license lamps 43 are attached to the brackets 41, 42.

According to this embodiment, the brackets 41, 42 for attaching the outer handle also serve as brackets for attaching the license lamps 43, which makes it possible to reduce the number of parts used in manufacturing the tailgate 1 accordingly, and as a result of the reduction in the number of the parts, contribute to a reduction in tailgate weight.

Figure 9:
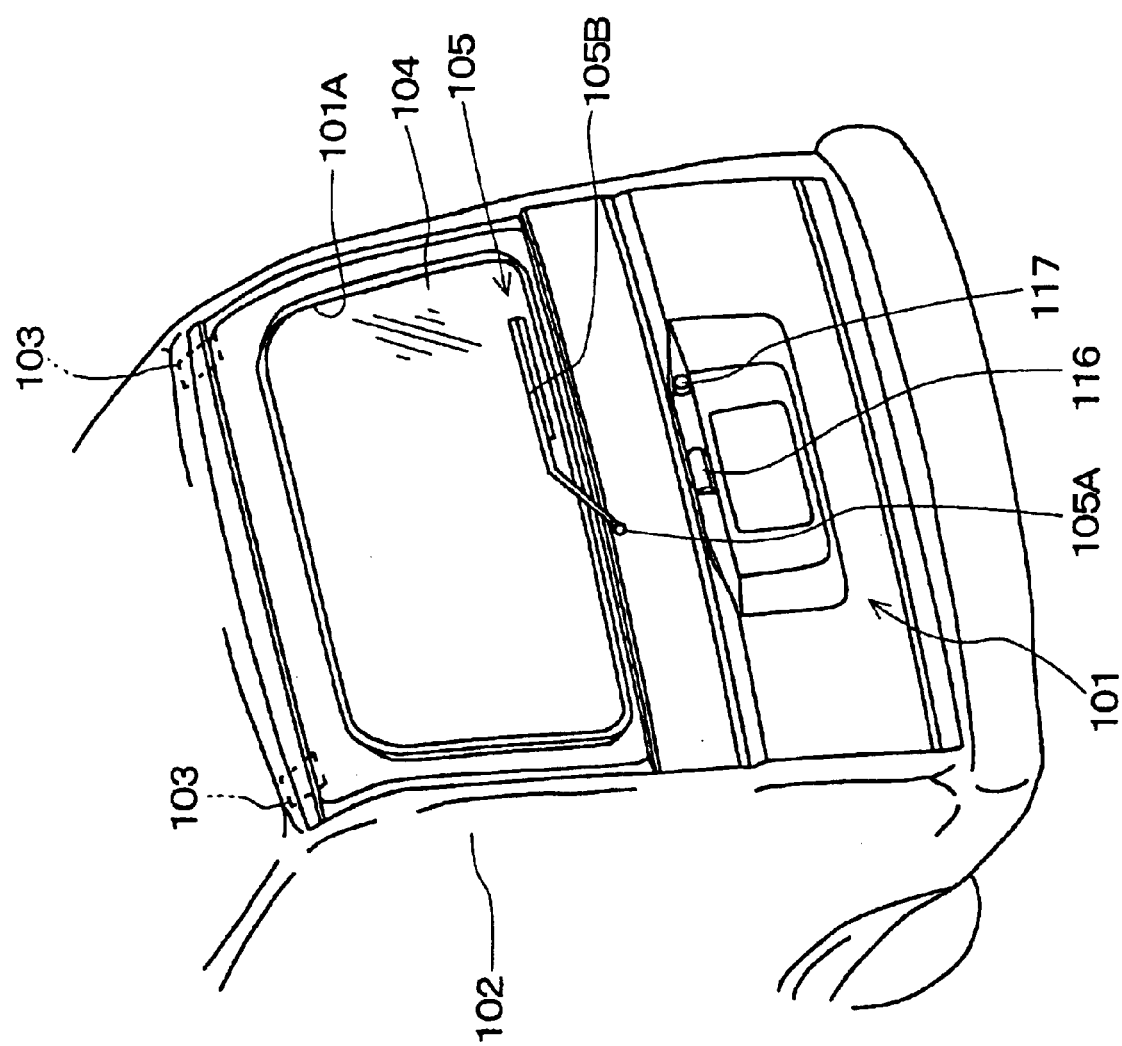
FIG. 9 is a perspective rear view of a four-wheel vehicle provided with a tailgate which is a vehicle door according to another embodiment of the present invention.

FIG. 9 shows a tailgate 101 of a four-wheel vehicle according to an embodiment different from that of the tailgate in FIG. 1. This tailgate 101 is attached to the vehicle body 102 with hinges 103 disposed in an upper part thereof, and is free to open/close in a vertical direction around the hinges 103. Furthermore, a wiper apparatus 105 for cleaning a glass 104 fitted in a window cavity 101A is attached to the tailgate 101, and a base end portion of a wiper arm 105B is connected to a rocking shaft 105A of this wiper apparatus 105.

Figure 10:
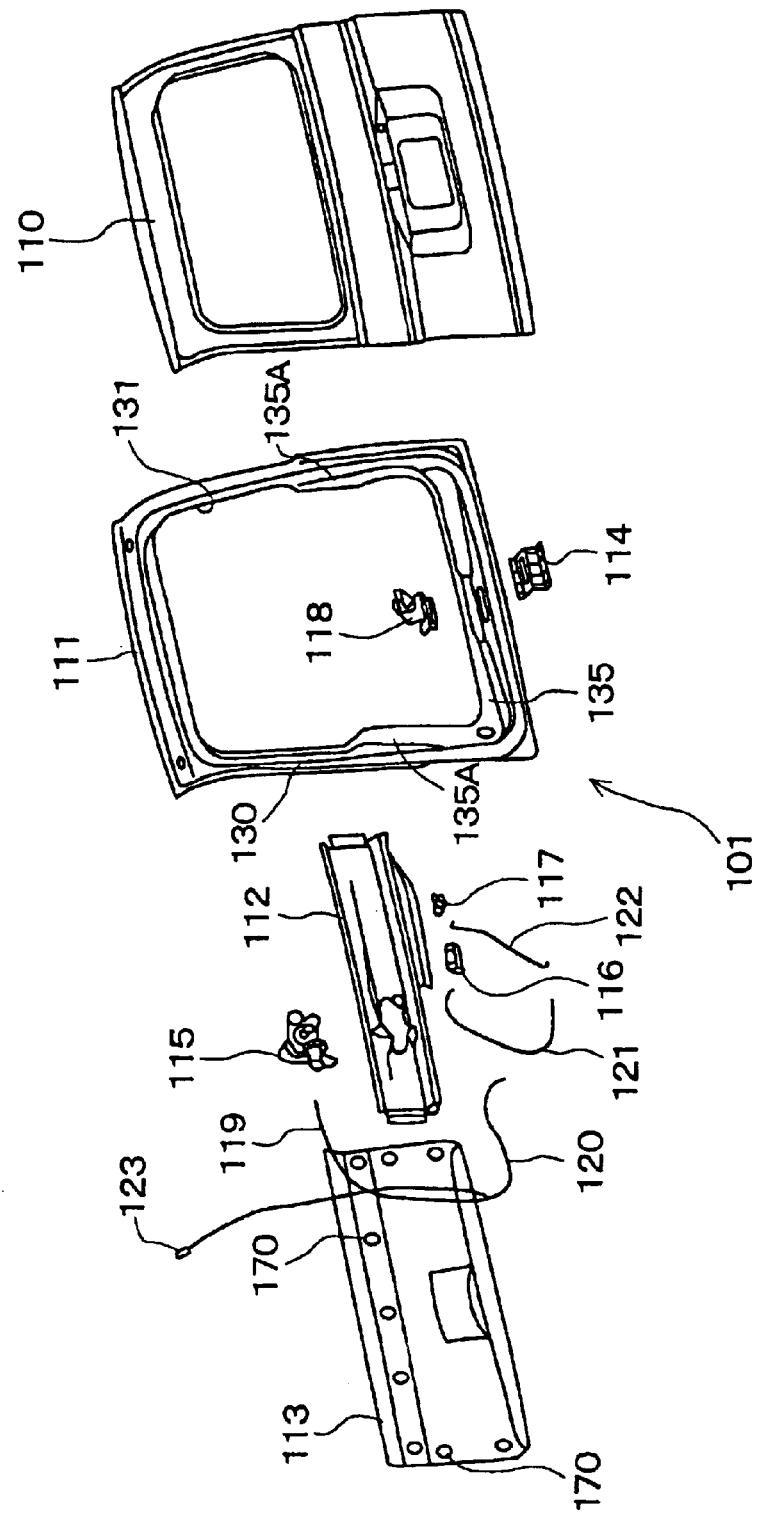
FIG. 10 is an exploded perspective view of the tailgate in FIG. 9.

An exploded view of the tailgate 101 is shown in FIG. 10. The tailgate 101 is formed to include, as its main constituent members, an outer panel 110 on an outer side of the vehicle, an inner panel 111 on an inner side of the vehicle, a reinforcing member 112 whose right and left end portions are joined to a surface of the inner panel 111 on the inner side of the vehicle, and a lining 113 disposed on a further inner side of the vehicle than the reinforcing member 112, and besides these tailgate parts, a reinforcing member 114 for attaching a door lock which is attached to the inner panel 111 is provided. Furthermore, a wiper motor 115 of the wiper apparatus. 105, an outer handle 116, a key cylinder 117, and a door lock 118 are assembled onto the tailgate 101 as door parts, and moreover, a harness 119 extending to the wiper motor 115 from a vehicle body 102 side, a harness 120 extending to the door lock 118 from the vehicle body 102 side, a member 121 for manually operating a door lock suspended between the outer handle 116 and the door lock 118, and a rod 122 for operating door lock key suspended between the key cylinder 117 and the door lock 118 are assembled onto the tailgate 101, and in end portions of the harnesses 119 and 120 on the vehicle body 102 side, couplers 123 connected to harnesses wired on the vehicle body 102 side are disposed.

The outer panel 110, the inner panel 111, the reinforcing member 112, and the reinforcing member 114 for attaching door lock are sheet metal pressed products and the lining 113 is a synthetic resin product.

The outer panel 110 shown in FIG. 11 has a recessed portion 110B, which is formed below a window cavity 101A in which a glass 104 shown in FIG. 9 is fitted, for fitting a license plate therein, and in an upper side portion of this recessed portion 110B, holes 110C and 110D for exposing the outer handle 116 and the key cylinder 117 from the outer panel 110 are provided, and furthermore, between the window cavity 101A and the recessed portion 110B, a hole 110E for exposing the rocking shaft 105A of the wiper apparatus 105 shown in FIG. 9 from the outer panel 110 is formed.

Figure 12:
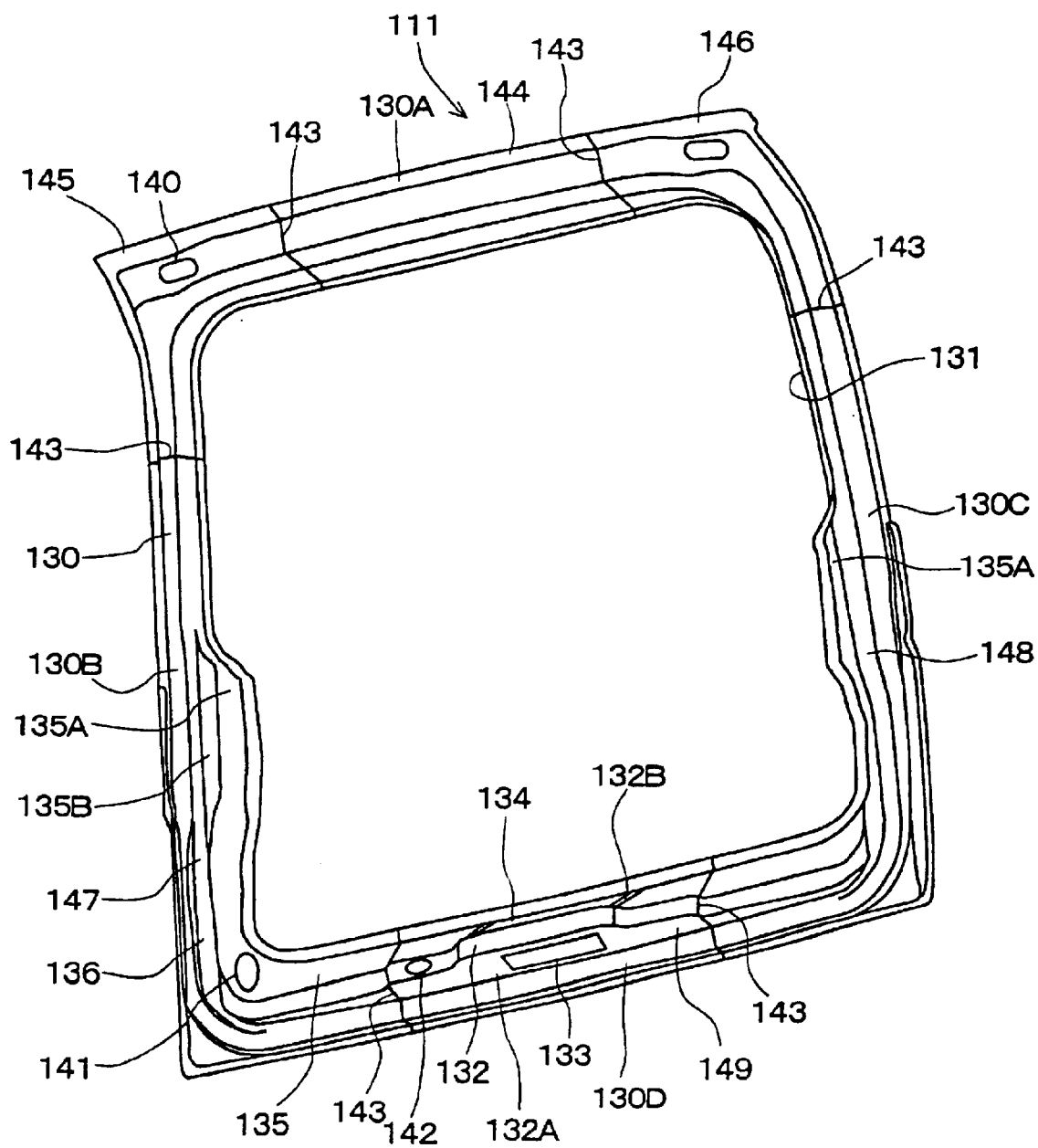
FIG. 12 is an entire perspective view of an inner panel in FIG. 10

The total size and shape of the inner panel 111 shown in FIG. 12 are substantially the same as those of the outer panel 110, but this inner panel 111 has only a marginal portion 130 of the whole periphery, with a large opening portion 131 formed inside the marginal portion 130, so that the inner panel 111 is in a frame shape as a whole. The marginal portion 130 is composed of an upper marginal portion 130A, right and left side marginal portions 130B and 130C, and a lower marginal portion 130D, with a hollow portion 132 sinking in an inward direction of the vehicle being formed in the lower marginal portion 130D, with a lower surface of this hollow portion 132 being a horizontal or substantially horizontal surface 132A for attaching door lock, and with an opening portion 133 allowing a lock member, which extrudes and recesses from the door lock 118 to lock the tailgate 101 to the vehicle body 102 and release locking, to pass therethrough being provided in this surface 132A. Furthermore, an opening portion 134 is also formed in an inclined upper surface 132B of the hollow portion 132, so that the door lock 118 can be placed in and attached to the surface 132A reinforced by the aforesaid reinforcing member 114 for attaching door lock by inserting the door lock 118 into this opening portion 134 from above.

Figure 14:
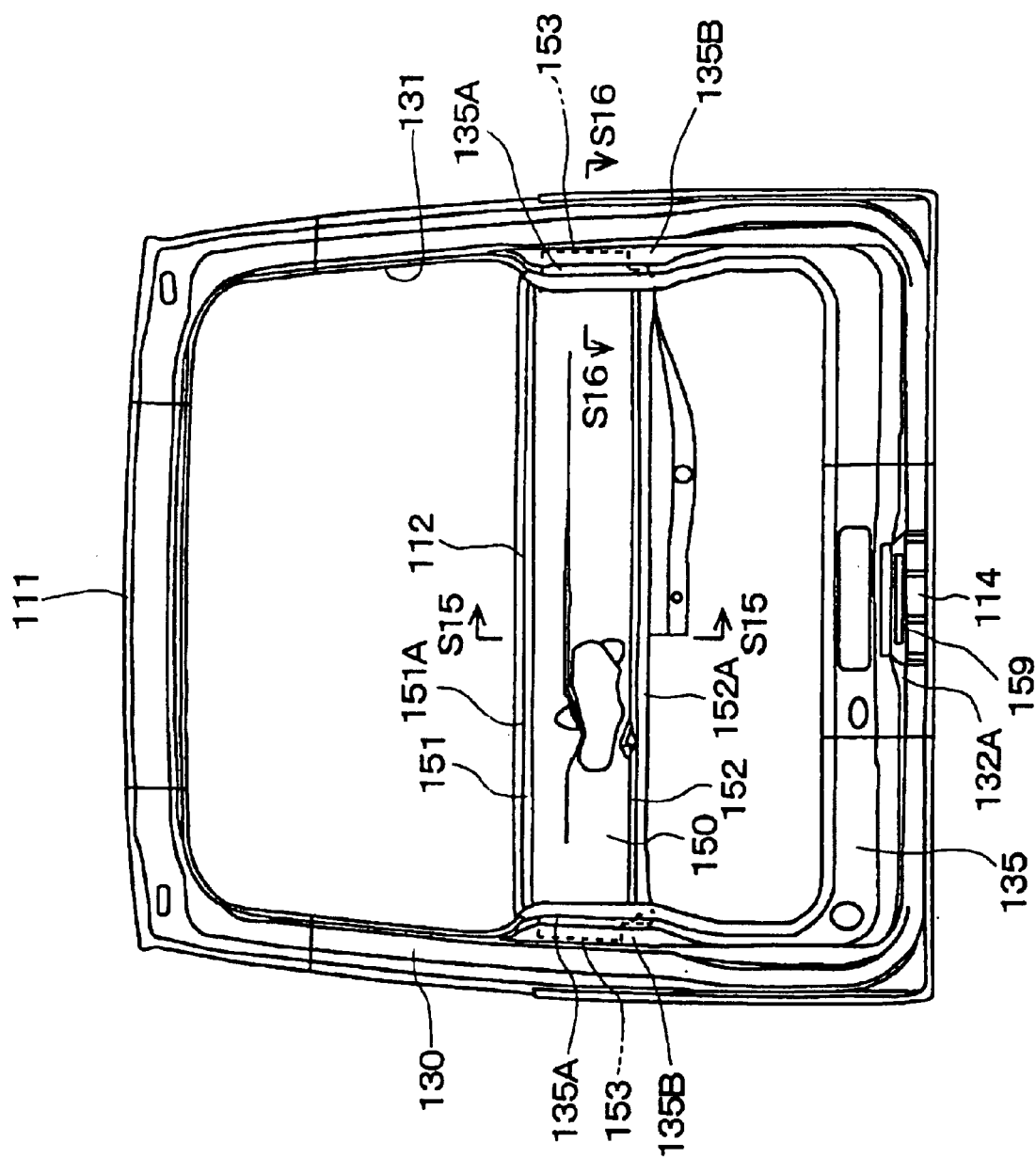
FIG. 14, which is a view omitting the outer panel, is a front view seen from an outer side of the vehicle when the reinforcing member is disposed to extend between right and left side marginal portions in a marginal portion of the inner panel.

Furthermore, on the right and left side marginal portions 130B, 130C and the lower marginal portion 130D in the marginal portion 130, a ridge portion 135 bulging in an outward direction of the vehicle is formed continuously along these side marginal portions 130B, 130C and the lower marginal portion 130D, and this ridge portion 135 is for forming a predetermined spaced interval between the outer panel 110 disposed on a further outer side of the vehicle than the ridge portion 135 and the inner panel 111 to secure a predetermined thickness of the tailgate 101. In the ridge portion 135, portions formed on the right and left side marginal portions 130B, 130C are rising portions 135A having a large bulging amount, and on base end portions of the rising portions 135A, flat surfaces 135B are provided, as shown in FIG. 14 and in FIG. 16 which is a cross sectional view taken along the line S16—S16 in FIG. 14 and in which the outer panel 110 when connected to the inner panel 111 is also shown. The flat surfaces 135B are perpendicular or substantially perpendicular to the direction of opening/closing of the tailgate 101 around the hinges 103 shown in FIG. 9, and the rising portions 135A are parallel or substantially parallel to the opening/closing direction of this tailgate 101.

Figure 16:
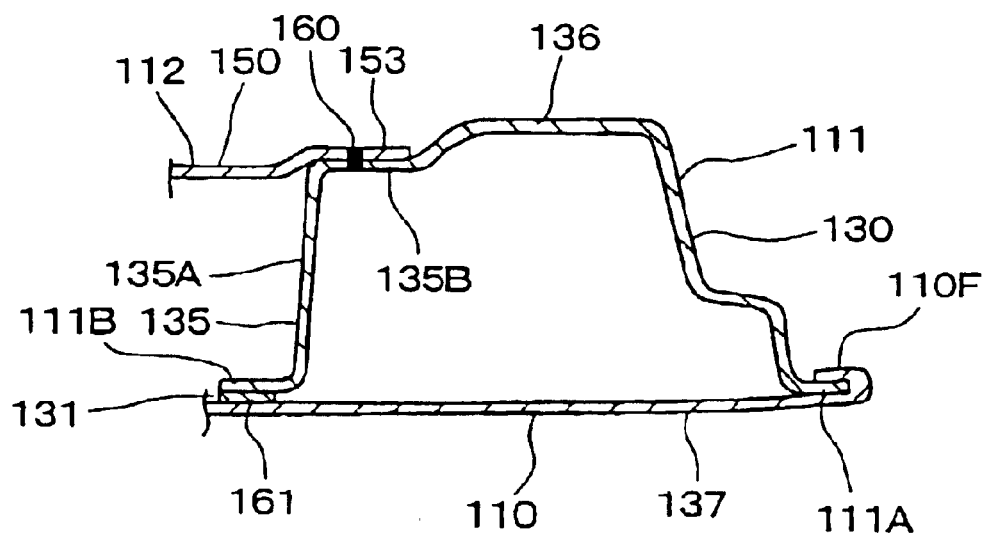
FIG. 16, which is a view including the outer panel, is a cross sectional view taken along the line S16—Sl6 in FIG. 14.

Moreover, a hat-shaped portion 136 having a cross section in a hat shape and opening toward the outer side of the vehicle is formed in the marginal portion 130 of the inner panel 111 as shown in FIG. 16, and this hat-shaped portion 136 is formed continuously along the whole periphery of the inner panel 111, though its width and depth differ depending on each portion of the inner panel 111 as shown in FIG. 12. As shown in FIG. 16, when the inner panel 111 and the outer panel 110 are connected to each other, the opening side of the hat-shaped portion 136 is covered with the outer panel 110, so that a box shaped portion 137 having a cross section in a box shape is formed along the whole periphery of the tailgate 101.

As shown in FIG. 12, holes 140 to 142 are formed in appropriate places of the marginal portion 130 of the inner panel 111, and these holes 140 to 142 are used for wiring the aforesaid harnesses 119, 120 and the member 121 for manually operating door lock on the inner panel 111.

Furthermore, the inner panel 111 is formed of constituent elements 144 to 149 joined together via joining portions 143 by laser welding. In other words, the inner panel 111 is formed by joining totally six blank materials, which are materials for the constituent elements 144 to 149, by laser welding which is carried out by facing end portions of the adjoining blank materials with each other, thereby forming a tailored blank, and thereafter, by press-forming and blank-forming this tailored blank with a press machine.

Incidentally, the manufacturing of the tailored blank by joining the totally six blank materials together by laser welding may be carried out in such a manner that each of the blank materials is press-formed and blank-formed with the press machine in advance and thereafter, these blank materials are welded by laser welding.

The constituent elements 145, 146 out of the constituent elements 144 to 149 form hinge attaching portions to which the hinges 103 in FIG. 9 are attached, and the other constituent elements 144, and 147 to 149 form portions other than the hinge attaching portions. The blank materials for the constituent elements 145, 146, which have a larger plate thickness than that of the constituent elements 144 and 147 to 149, have a plate thickness of, for example, 1.4 mm, and the plate thickness of the blank materials for the constituent elements 144 and 147 to 149 is, for example, 0.6 mm. Therefore, in the tailgate 101, which is formed using the blank materials having two different plate thickness, the blank materials in the hinge attaching portions have a larger plate thickness than that of the blank materials in the portions other than the hinge attaching portions, and a portion except the hinge attaching portions and except the portion of the constituent element 144 is formed by joining totally three blank materials having the same plate thickness. Since this portion is formed of the constituent elements 147 to 149, it has a bending shape.

Figure 13:
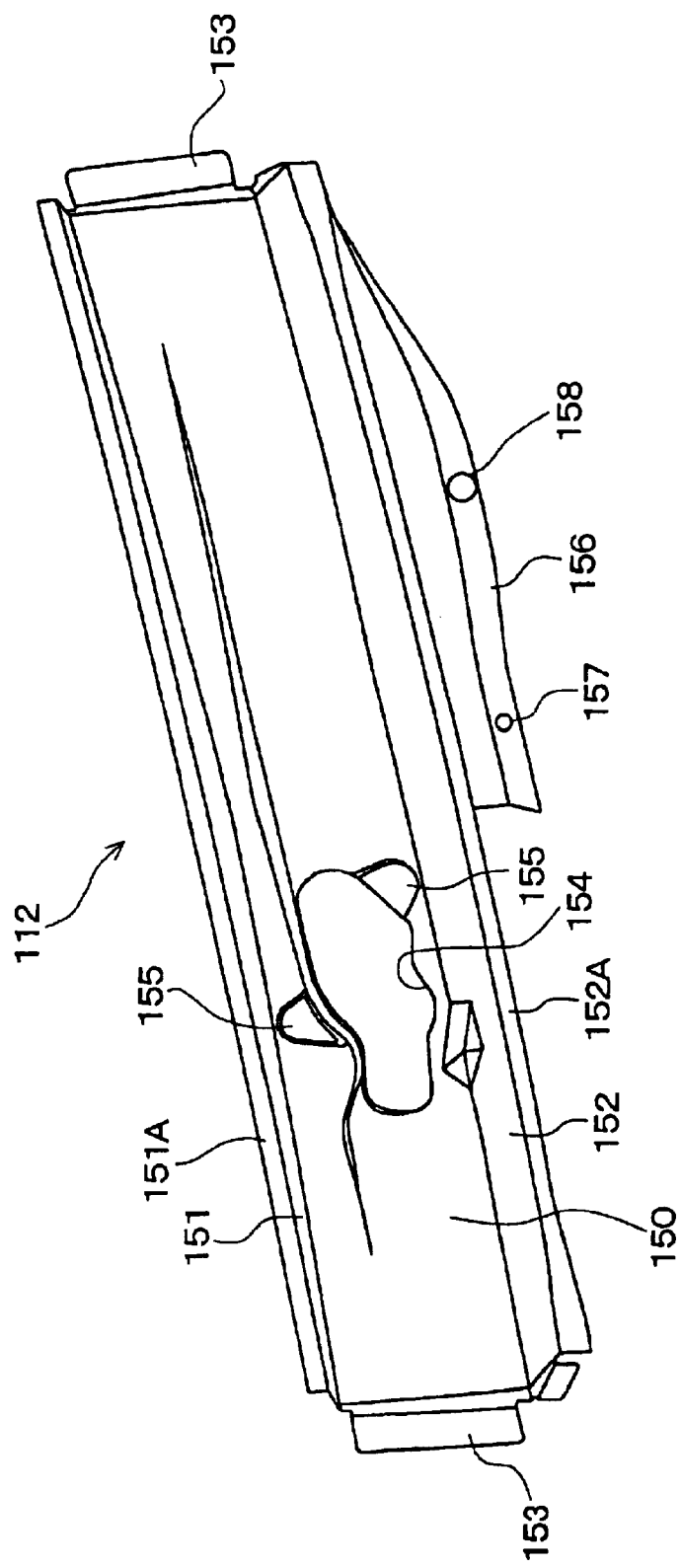
FIG. 13 is an entire perspective view of a reinforcing member in FIG. 10.

The entire shape of the reinforcing member 112 shown in FIG. 13 is a long and narrow shape which is long in a right and left direction. Therefore, while the module plate 4 in the previously described embodiment shown in FIG. 2 is formed of the first extending portion 13 extending in the right and left direction and the second extending portion 14 extending downward from the substantially central part of this first extending portion 13 to have a substantially T-shape, the reinforcing member 112 in this embodiment is formed only of a portion corresponding to the first extending portion, so that it is lightened to a greater extent than the module plate 4.

Moreover, this reinforcing member 112 is a bent member including two flanges 151, 152 which bend toward the outer side of the vehicle from upper and lower end portions of a web 150 whose width direction corresponds to a vertical direction, so that the web 150 and the two flanges 151, 152 formed along the whole length of this web 150 cause this reinforcing member 112 to have a cross section in a substantially C-shape, in other words, a channel shape. In addition, lips 151A, 152A are provided along edges of the flanges 151, 152 respectively, and joining pieces 153 joined to the flat surfaces 135B in the ridge portion 135 of the inner panel 111 shown in FIG. 14 and FIG. 16 are provided along right and left end portions of the reinforcing member 112.

Figure 17:
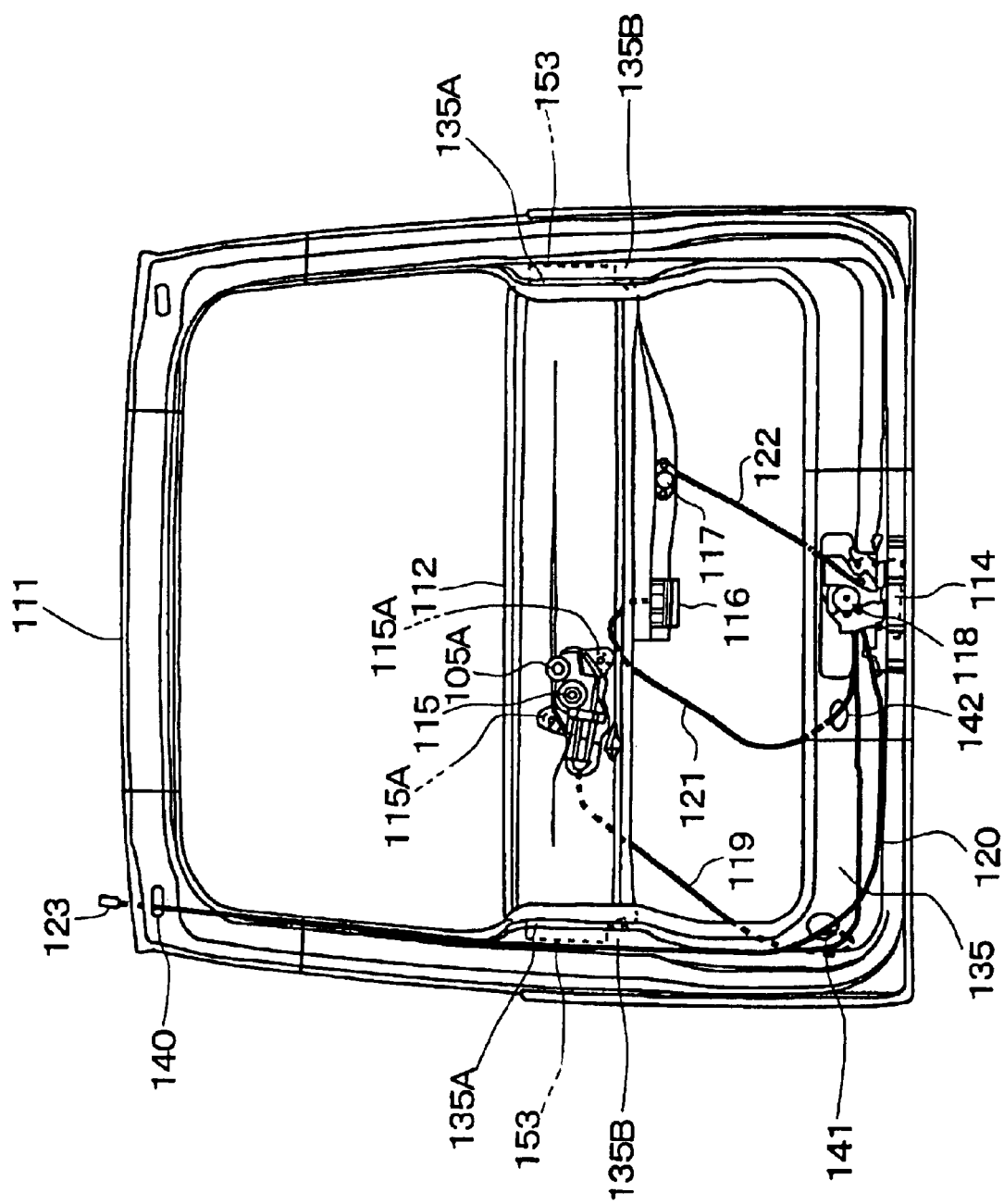
FIG. 17, which is a view omitting the outer panel, is a view showing the state after the work of assembling a door lock, a key cylinder, and so on as door parts is finished after the state shown in FIG. 14, and after the wiring of the harnesses is also finished.

A hole 154 for inserting a wiper motor 115 attached to the reinforcing member 112 therethrough from the inner side of the vehicle is formed in the web 150, and adjacent to this hole 154, a connecting surface 155 for having a bracket 115A (refer to FIG. 17 and FIG. 19) of the wiper motor 115 connected thereon with a bolt and a nut is formed. Incidentally, the rocking shaft 105A of the wiper apparatus 105 shown in FIG. 9 is provided in the wiper motor 115 as shown in FIG. 17. Furthermore, an extending piece 156 hangs from the lower flange 152 of the reinforcing member 112 as shown in FIG. 13, and in this extending piece 156 to which the outer handle 116 and the key cylinder 117 shown in FIG. 9 are attached, a hole 157 for having the aforesaid member 121 for manually operating door lock, which is connected to the outer handle 116, inserted therethrough and a hole 153 for having the key cylinder 117 inserted therethrough are formed.

Manufacturing works of the tailgate 101 are carried out as follows.

First, the reinforcing member 114 for attaching door lock is attached to the surface 132A for attaching door lock of the inner panel 111 by spot welding. An opening portion 159 is formed in this reinforcing member 114 for attaching door lock as shown in FIG. 14, and this opening portion 159 is communicated with the opening portion 133 shown in FIG. 12, so that the locking member which extrudes and recesses from the door lock 118 to lock the tailgate 101 to the vehicle body 102 and release locking can pass through the opening portions 133 and 159 when the door lock 118 is attached to the surface 132A reinforced by the reinforcing member 114.

Thereafter, the work of disposing the reinforcing member 112 in a long and narrow shape which is long in the right and left direction to extend between the right and left side marginal portions 130B and 130C in the marginal portion 130 of the inner panel 111 from the inner side of the vehicle is carried out, and as shown in FIG. 14, this disposing work is carried out in such a manner that the two upper and lower flanges 151, 152 of the reinforcing member 112 are faced with the outer side of the vehicle, the joining pieces 153 in the right and left end portions of the reinforcing member 112 are brought in contact with the flat surfaces 135B of the ridge portion 135 of the inner panel 111 from the inner side of the vehicle, and the joining pieces 153 and the flat surfaces 135B are joined together by spot welding. The arrangement position of the reinforcing member 112 in terms of the vertical direction of the inner panel 111 at this time is such that the position of the upper flange 151 of the reinforcing member 112 corresponds to a position slightly lower than a lower side portion of the window cavity 101A of the outer panel 110 shown in FIG. 11. This state is shown in FIG. 14.

In FIG. 16 showing the state after the outer panel 110 and the inner panel 111 are connected to each other, the state in which the joining piece 153 of the reinforcing member 112 and the flat surface 135B of the ridge portion 135 of the inner panel 111 are joined together via a welding portion 160 by spot welding is shown.

Next, the work of connecting the outer panel 110 and the inner panel 111 to each other is carried out. As shown in FIG. 16, this connecting work is carried out in such a manner that a hemming work of folding an outer peripheral portion 110f of the outer panel 110 and pressing it onto an outer peripheral portion 111A of the inner panel 111 on which an adhesive is applied in advance is carried out, and thereafter, the outer peripheral portions 101F, 111A of the outer panel 110 and the inner panel 111 are joined together by spot welding, or a hemming work of folding the outer peripheral portion 110F of the outer panel 110 and pressing it onto the outer peripheral portion 111A of the inner panel 111 on which a heat curable adhesive is applied in advance is carried out, and thereafter, the heat curable adhesive is heated to be cured, and this work is carried out along the whole peripheries of the outer panel 110 and the inner panel 111. Meanwhile, a sealer 161 is applied on a peripheral portion of the inner panel 111 on the side of the aforesaid opening portion 131, namely, an inner peripheral portion 111B, thereby preventing the inner peripheral portion 111B from coming in direct contact with the outer panel 110. This sealer 161 is applied discontinuously in portions along the whole periphery of the inner peripheral portion 111B except portions corresponding to a place in which the glass 104 shown in FIG. 9 is fitted and corresponding to the aforesaid lip 151A of the reinforcing member 112 shown in FIG. 14.

Incidentally, the places in the inner peripheral portion 111B of the inner panel 111 on which the sealer 161 is not applied are spot-welded to the outer panel 110.

As described above, when the work of connecting the outer panel 110 and the inner panel 111 to each other is carried out, the opening side of the aforesaid hat-shaped portion 136 of the inner panel 111 shown in FIG. 16 is covered with the outer panel 110, so that this hat-shaped portion 136 becomes the box-shaped portion 137.

Figure 15:
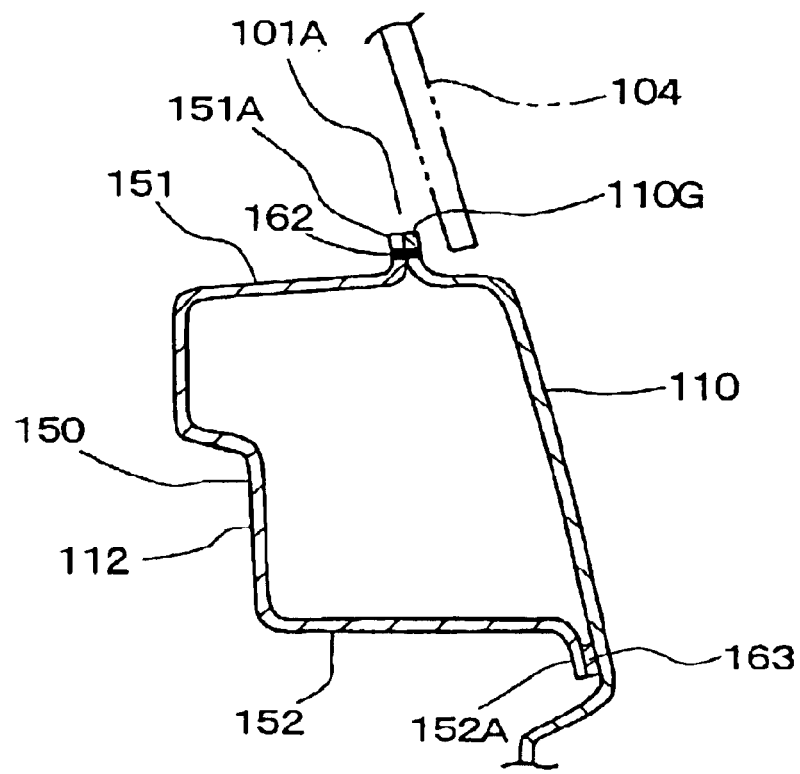
FIG. 15, which is a view including the outer panel, is a cross sectional view taken along the line S15—S15 in FIG. 14.

Meanwhile, the lip 151A of the upper flange 151 of the reinforcing member 112 and a peripheral portion 110G forming the lower side portion of the window cavity 101A in the outer panel 110 are joined together via a welding portion 162 by spot welding as shown in FIG. 15 which is a cross sectional view taken along the line S15—S15 in FIG. 14 and in which the outer panel 110 connected to the inner panel 111 is also shown. A sealer 163 is applied continuously or discontinuously along the whole length of the lip 152A of the lower flange 152 of the reinforcing member 112. This sealer 163 prevents the lip 152A from coming in direct contact with the outer panel 110.

Through the above-described works, the outer panel 110, the inner panel 111, and the reinforcing member 112 are integrally connected. Thereafter, these outer panel 110, inner panel 111, and reinforcing member 112 are painted and surface finish work is given to each of them. This painting work includes electrodeposition coating of the outer panel 110, the inner panel 111, and the reinforcing member 112, the electrodeposition coating being carried out by soaking them in an electrodeposition solution contained in an electrodeposition bath. By this electrodeposition coating, surfaces of the outer panel 110, the inner panel 111, and the reinforcing member 112 including the welding portions 160, 162 are painted. The electrodeposition solution is surely absorbed inside the box-shaped portion 137 shown in FIG. 16 since the sealer 161 is applied discontinuously along the inner peripheral portion 111B of the inner panel 111, so that the inner surface of this box-shaped portion 137 is also painted.

Thereafter, the work of assembling the wiper motor 115, the outer handle 116, the key cylinder 117, and the door lock 118 which are door parts is carried out. The work of assembling the wiper motor 115 is carried out in such a manner that the wiper motor 115 is inserted through the hole 154 of the reinforcing member 112 shown in FIG. 13 from the inner side of the vehicle and the brackets 115A of the wiper motor 115 shown in FIG. 17 are connected to the surface of a connecting surface 155 of the reinforcing member 112 on the inner side of the vehicle using bolts and nuts. The work of assembling the outer handle 116 is carried out in such a manner that the outer handle 116 is connected using a bolt and a nut to the position of the extending piece 156 of the reinforcing member 112 where the hole 157 is formed, and the work of assembling the key cylinder 117 is carried out in such a manner that the key cylinder 117 is inserted into the hole 158 which is formed in the extending piece 156 of the reinforcing member 112 and a bracket 117A (refer to FIG. 19) of the key cylinder 117 is connected to the extending piece 156 using a bolt and a nut.

Furthermore, the work of assembling the door lock 118 is carried out in such a manner that the door lock 118 is inserted from above to the opening portion 134 which is formed in the inclined upper surface 132B of the hollow portion 132 of the inner panel 111 shown in FIG. 12, thereby placing the door lock 118 on the surface 132A which is reinforced by the aforesaid reinforcing member 114 for attaching door lock, and the door lock 118 is connected to this surface 132A via a bolt and a nut.

Figure 11:
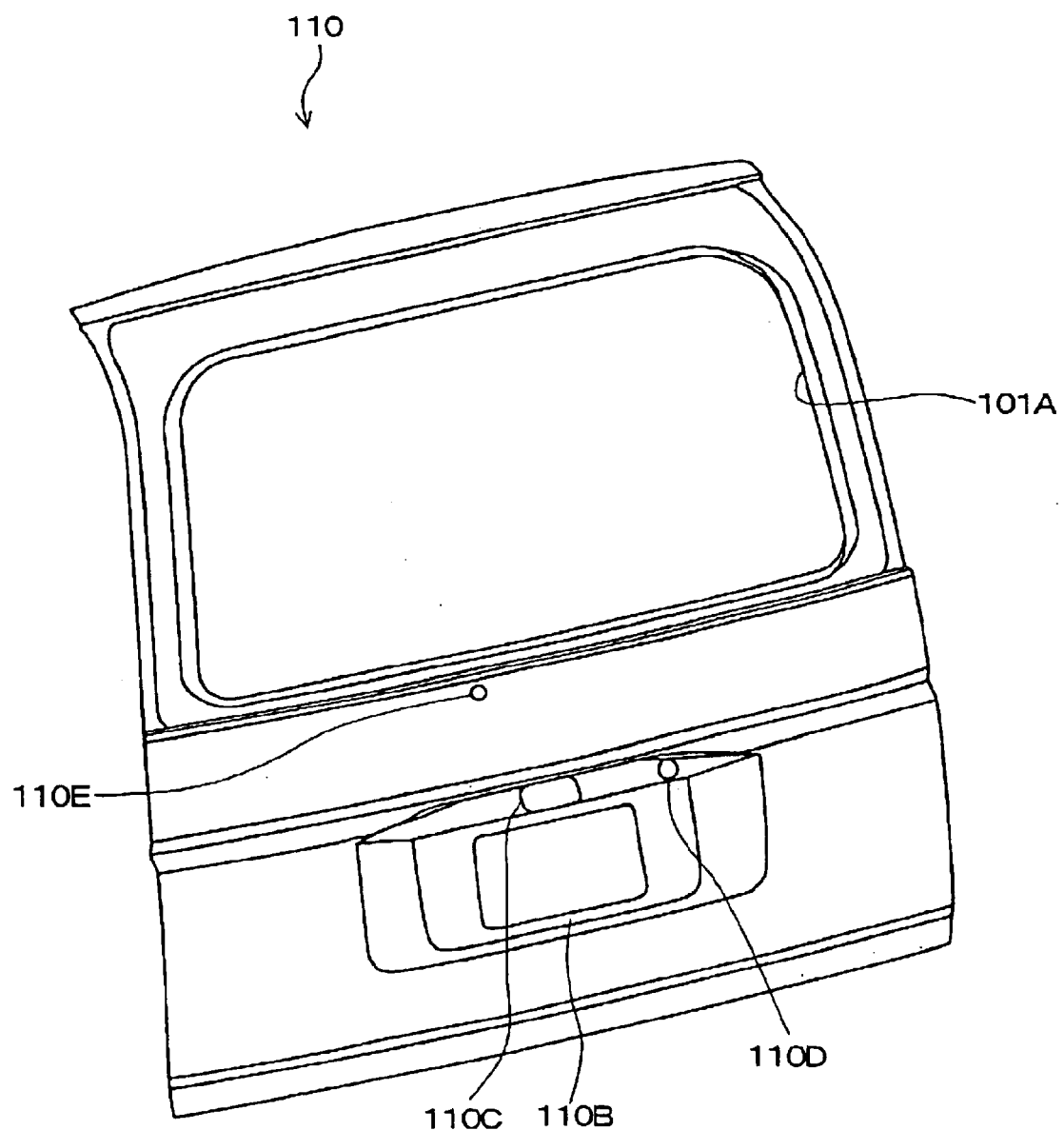
FIG. 11 is an entire perspective view of an outer panel in FIG. 10.

When the above-described works are finished, the outer handle 116, the key cylinder 117, the rocking shaft 105A of the wiper motor 115 are exposed from the hole 110C, the hole 110D, the hole 110E of the outer panel 110 shown in FIG. 11, respectively.

Next, the aforesaid harnesses 119, 120 are inserted from the inner side of the vehicle through the hole 140 of the inner panel 111 shown in FIG. 12, and these harnesses 119, 120 are inserted through the inner part of the aforesaid box-shaped portion 137, with an end portion of the harness 119 protruded from the hole 141 of the inner panel 111 shown in FIG. 12 to be connected to the wiper motor 115 and with an end portion of the harness 120 connected to the door lock 118 by the work from the aforesaid opening portion 134 of the inner panel 111. Furthermore, the aforesaid member 121 for manually operating door lock is inserted through the hole 142 of the inner panel 111 shown in FIG. 12 and the hole 157 of the reinforcing member 112 shown in FIG. 13, so that it is suspended between the outer handle 116 and the door lock 118, and the aforesaid rod 122 for operating the door lock key is inserted to the aforesaid opening portion 134 of the inner panel 111, so that it is suspended between the key cylinder 117 and the door lock 118.

The state after this work is finished is shown in FIG. 17. In FIG. 17, the outer panel 110 is omitted.

Figure 18:
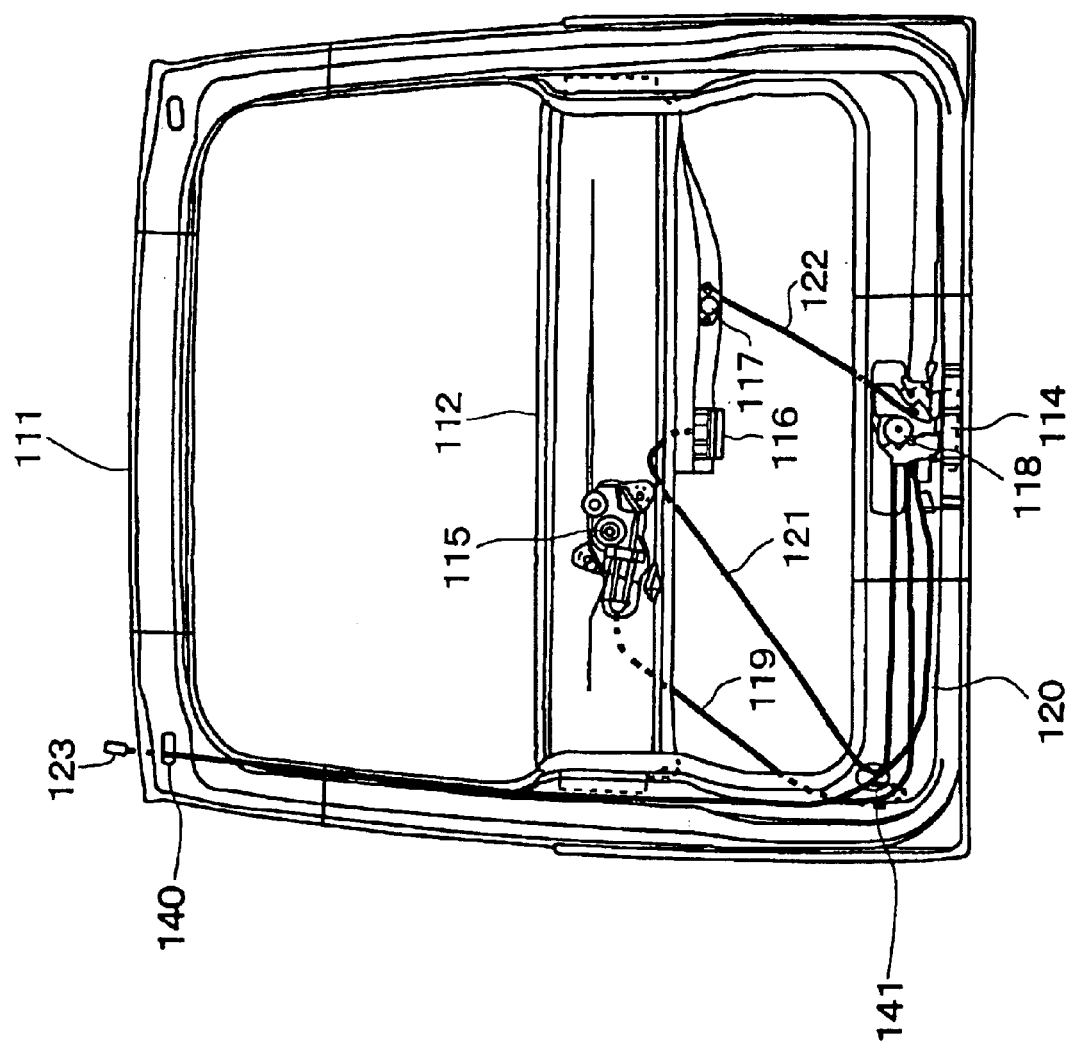
FIG. 18 is a view similar to FIG. 17, showing another embodiment in which wiring of the harnesses is different.

Incidentally, as shown in FIG. 18 in which the outer panel 110 is similarly omitted, the member 121 for manually operating door lock may be inserted through the hole 141 to omit the hole 142.

After the above-described works are finished, the work of attaching the lining 113 shown in FIG. 10 to the surfaces of the reinforcing member 112 and the inner panel 111 on the inner side of the vehicle is carried out in such a manner that catching members 170 such as the clips provided on the lining 113 are caught in caught portions such as holes formed in the reinforcing member 112 and the inner panel 111, and the work of fitting the glass 104 in the window cavity 101A shown in FIG. 9 is carried out. The work of attaching the lining 113 causes the reinforcing member 112, the wiper motor 115, and so on to be hidden from the inner side of the vehicle.

According to the embodiment explained above, the inner panel 111 as a main component of the tailgate 101 is also in a frame shape, having only the marginal portion 130 of the whole periphery, so that it becomes light, thereby enabling the total weight of the tailgate 101 to be reduced.

Furthermore, the reinforcing member 112 extends between the right and left side marginal portions 130B, 130C in the marginal portion 130 of the inner panel 111, so that the reinforcing member 112 reinforces the inner panel 111 to secure the strength of the inner panel 111 after the reinforcing member 112 is connected thereto. Moreover, the reinforcing member 112 is in a long and narrow shape which is long in the right and left direction and does not have a large area, so that the reinforcing member 112 is light, and consequently, the weight of the inner panel 111 and the total weight of the tailgate 101 after the reinforcing member 112 is connected thereto are not increased very much.

Furthermore, the reinforcing member 112 does not have a flat plate shape but is a bent member having the web 150 and the flanges 151, 152 bending from the web 150, so that the strength of the reinforcing member 112 itself is increased, thereby enabling the strength of the inner panel 111 and the strength of the tailgate 101 to be increased when the reinforcing member 112 is connected thereto.

Especially, the reinforcing member 112 according to this embodiment has a substantially C-shaped cross section, in which the two flanges 151, 152 bend from the upper and lower edge portions of the web 150 whose width direction corresponds to the vertical direction, and these flanges 151, 152 are formed continuously in the longitudinal direction of the web 150, and, unlike the case when this reinforcing member has a front section in a T-shape and so on, the lower flange 152 does not come to an end halfway in the longitudinal direction of the web 150. Consequently, in the strength of the reinforcing member 112, the strength owing to the upper and the lower flanges 151, 152 is kept as it is, so that the strength of the inner panel 111 and the strength of the tailgate 101 can be sufficiently increased after the reinforcing member 112 is connected thereto.

Furthermore, the reinforcing member 112 is connected to the inner panel 111 with the opening portion thereof, whose cross section is in a substantially C-shape, facing the outer side of the vehicle, in other words, with the upper and lower flanges 151, 152 facing the outer side of the vehicle, and these flanges 151, 152 are in the state of being accommodated in a space inside the thickness of the tailgate 101 which is secured by the ridge portion 135 formed in the inner panel 111, so that the thickness of the tailgate 101 can be suppressed to a predetermined size even when these flanges 151, 152 for sufficiently increasing the strength of the reinforcing member 112 are provided in the reinforcing member 112.

Furthermore, the marginal portion 130 of the inner panel 111 has the hat-shaped portion 136 formed along the whole periphery of the inner panel, and by connecting this inner panel 111 and the outer panel 110 to each other, the box-shaped portion 137 is formed along the whole periphery of the door, so that this structure together with the reinforcing member 112 having a substantially C-shaped cross section can further increase the total strength of the tailgate 101.

Furthermore, the inner panel 111 is formed of the tailored blank which is formed by joining the blank materials having different thickness, and only the blank materials in the hinge attaching portions requiring a larger strength than the other portions has a larger plate thickness, so that securing of the strength required for the inner panel 111 and weight reduction can both be achieved at the same time.

Furthermore, since the portion except the hinge attaching portions and except the portion of the constituent element 144 is formed by joining three blank materials having the same plate thickness, unlike the case when this portion occupying a large area of the inner panel 111 and having a bending shape is formed of one blank material having a large area, blank materials having the same area and shape as or a little larger area and shape than those of the constituent elements 147 to 149 can be used as the three blank materials in the portion corresponding to the constituent elements 147 to 149 when the inner panel 111 is formed of the tailored blank consisting of the blank materials for the respective constituent elements 144 to 149, so that the inner panel 111 can be manufactured with an improved material yield.

Meanwhile, in this embodiment, the work of painting the outer panel 110, the inner panel 111, and the reinforcing member 112 is carried out after the outer panel 110, the inner panel 111, and the reinforcing member 112 are integrally connected by welding and before the work of assembling the door parts such as the door lock 118 is carried out, so that it becomes unnecessary to carry out the painting work separately for these outer panel 110, inner panel 111, and reinforcing member 112, thereby enhancing workability of the painting work. Furthermore, the welding portion 160 between the inner panel 111 and the reinforcing member 112 and the welding portion 162 between the outer panel 110 and the reinforcing member 112 can also be painted at the same time when the outer panel 110, the inner panel 111, and the reinforcing member 112 are painted.

Furthermore, the wiper motor 115, the outer handle 116, the key cylinder 117 as the door parts are attached to the reinforcing member 112, so that the reinforcing member 112 is also used as the attaching member for having these parts attached thereto, thereby eliminating the necessity of specially preparing an attaching member for the wiper motor 115, the outer handle 116, and the key cylinder 117.

Figure 19:
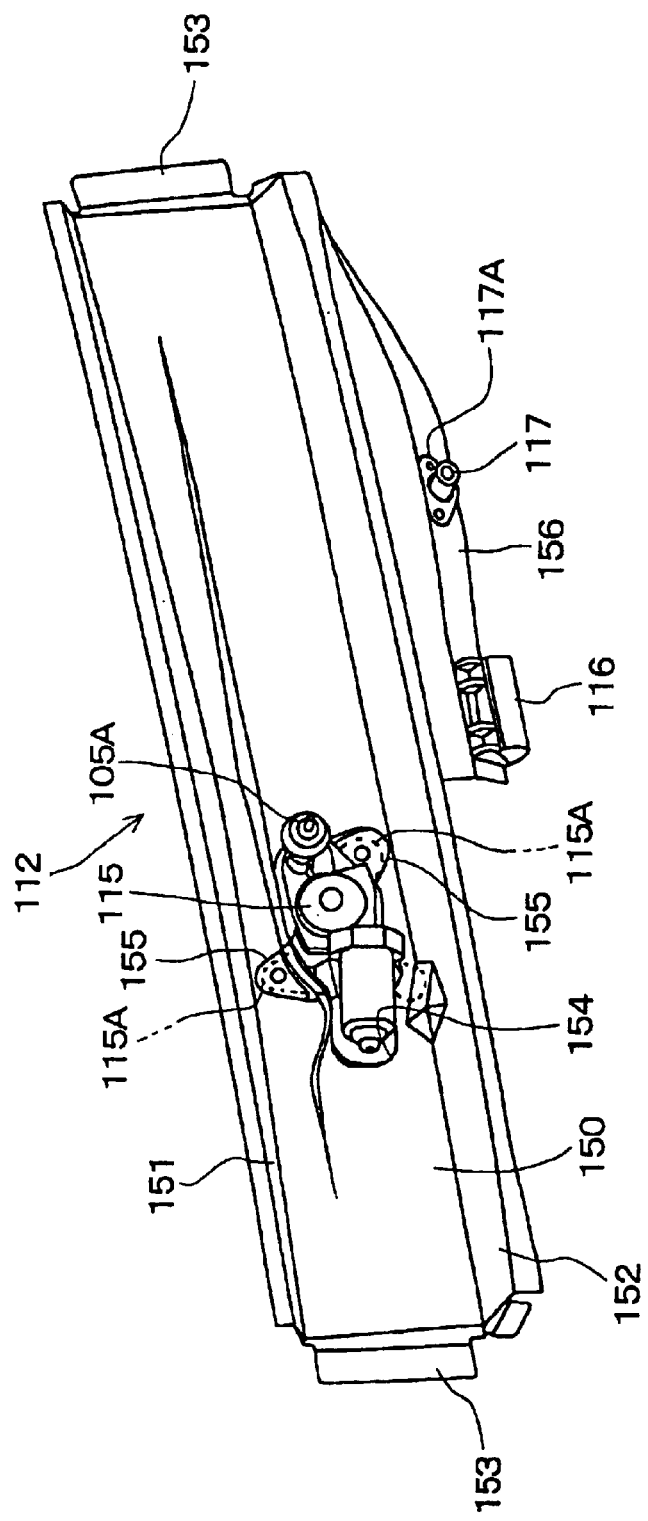
FIG. 19 is a view showing an embodiment of a manufacturing method of a tailgate in which a reinforcing member is a module member to which a wiper motor and so on as door parts are attached thereto in advance, and is a perspective view showing the reinforcing member when the wiper motor and so on are attached thereto.
Figure 20:
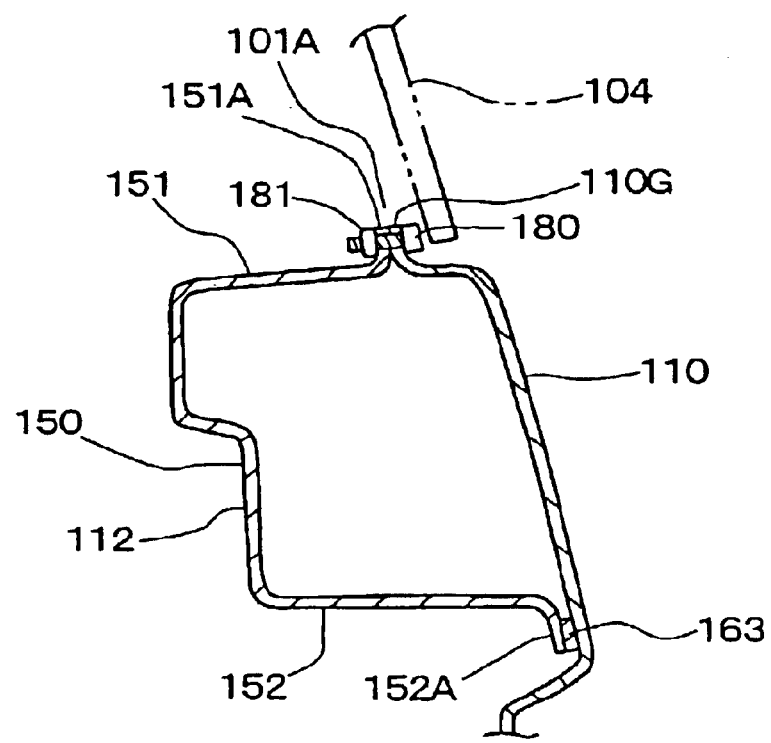
FIG. 20 is a similar view to FIG. 15 in the embodiment in FIG. 19.
Figure 21:
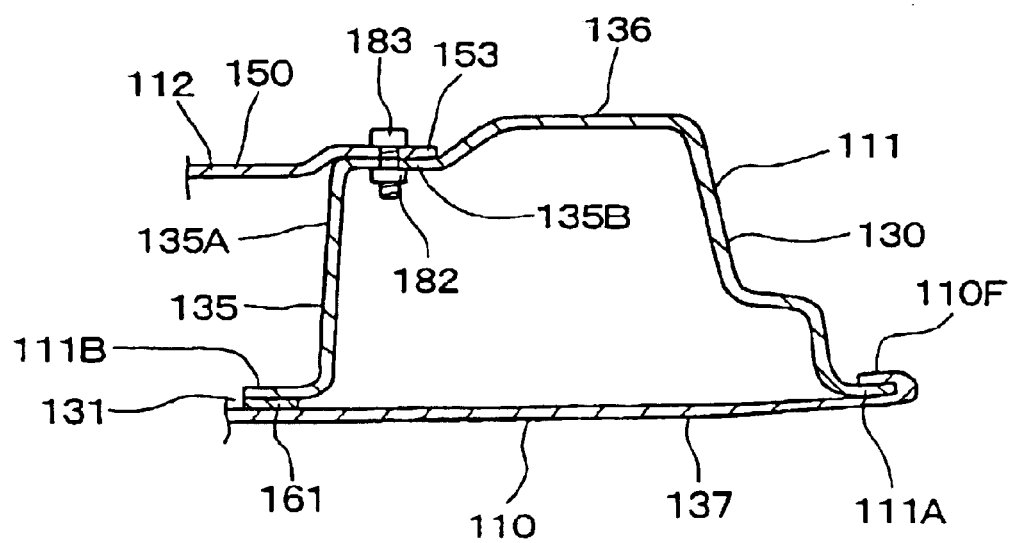
FIG. 21 is a similar view to FIG. 16 in the embodiment in FIG. 19.

FIG. 19 to FIG. 21 show an embodiment when the tailgate 101 is manufactured in a different work order from that of the manufacturing works described above.

In the manufacturing work of this embodiment, the inner panel 111 and the outer panel 110 are connected together by the aforesaid hemming work and so on after the reinforcing member 114 for attaching door lock is connected to the surface 132A for attaching door lock of the inner panel 111 by spot welding. Thereafter, the work of painting the outer panel 110 and the inner panel 111 integrally connected together is carried out, and subsequently, the door lock 118 is attached to the surface 132A reinforced by the reinforcing member 114 for attaching door lock of the inner panel 111 through the same work as the aforesaid manufacturing work.

After the above-described works or synchronously with them, the work of attaching the wiper motor 115, the outer handle 116, and the key cylinder 117 to the reinforcing member 112 is carried out to turn the reinforcing member 112 to a module member provided with these wiper motor 115, outer handle 116, and key cylinder 117 in advance, as shown in FIG. 19. This reinforcing member 112 is made of a material on which surface treatment is given in advance, namely, for example, a galvanized steel plate or a painted steel plate which is painted in advance.

Next, the work of connecting the peripheral portion 110G forming the lower side portion of the window cavity 101A in the outer panel 110 and the lip 151A of the upper flange 151 of the reinforcing member 112 using a stud bolt 180 and a nut 181 joined in advance to this peripheral portion 110G as shown in FIG. 20, and the work of joining the joining piece 153 of the reinforcing member 112 to the flat surface 135B of the marginal portion 130 of the inner panel 111 using a nut 182 and a bolt 183 joined in advance to this flat surface 135B as shown in FIG. 21 are carried out, and then, the work of applying the sealer 163 onto the lip 152A of the lower flange 152 of the reinforcing member 112 as shown in FIG. 20 and the work of applying the sealer 161 onto the inner peripheral portion 111B of the inner panel 111 on the opening portion 131 side as shown in FIG. 21 are carried out. Thereby, the work of disposing the reinforcing member 112 to extend between the right and left side marginal portions 130B, 130C in the marginal portion 130 of the inner panel 111 is carried out while joining the reinforcing member 112 to the outer panel 110.

Moreover, through the above works, the outer panel 110, the inner panel 111, and the reinforcing member 112 are integrally connected, and the work of assembling the wiper motor 115, the outer handle 116, the key cylinder 117, and the door lock 118 is finished.

Thereafter, similarly to the manufacturing works according to the aforesaid embodiment, the work of wiring the harnesses 119, 120, the work of suspending the member 121 for manually operating the door lock and the rod 122 for operating the door lock key, the work of attaching the lining 113 to the surfaces of the reinforcing member. 112 and the inner panel 111 on the inner side of the vehicle, and the work of fitting the glass 104 in the window cavity 101A are carried out.

In the manufacturing works of the tailgate according this embodiment, the outer panel 110 and the inner panel, 111 are painted after they are integrally connected, so that it becomes unnecessary to paint the outer panel 110 and the inner panel 111 separately, thereby enhancing the workability of the painting work accordingly.

Furthermore, the wiper motor 115, the outer handle 116, and the key cylinder 117 as the door parts are attached to the reinforcing member 112 before this reinforcing member 112 is disposed to extend between the right and left marginal portions 130B, 130C in the marginal portion 130 of the inner panel 111, so that this attaching work can be carried out in a work space having an open surrounding space, thereby enhancing workability.

Furthermore, the reinforcing member 112 is a module member to which these door parts are attached in advance, so that the assembling work of these door parts are carried out at the same time when the work of connecting the reinforcing member 112 to the inner panel 111 is carried out, thereby simplifying this assembling work.

Figure 22:
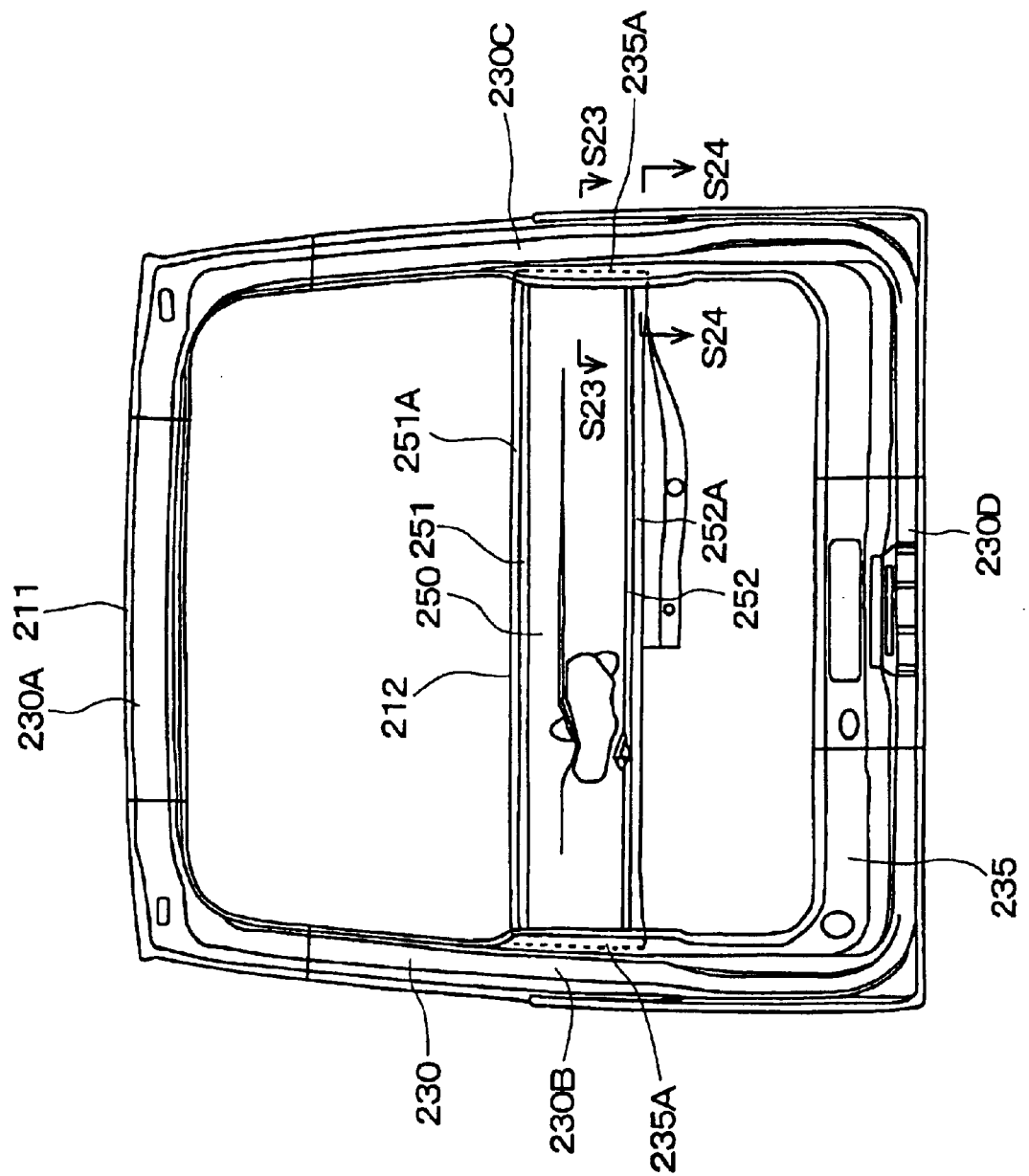
FIG. 22 is a similar view to FIG. 14 showing an embodiment in which right and left end portions of the reinforcing member are joined to places in the inner panel which are parallel or substantially parallel to an opening/closing direction of the tailgate.
Figure 23:
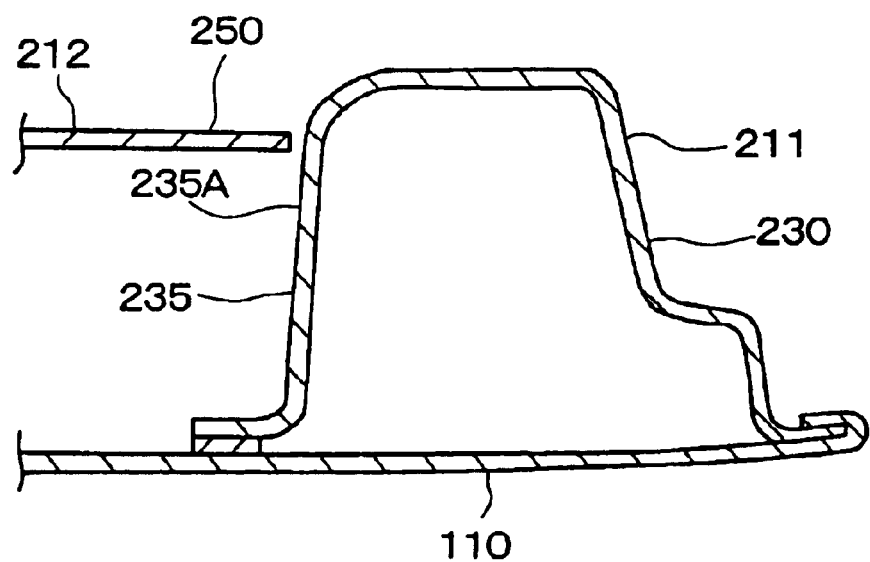
FIG. 23, which is a view including the outer panel, is a cross sectional view taken along the line S23—S23 in the embodiment in FIG. 22.
Figure 24:
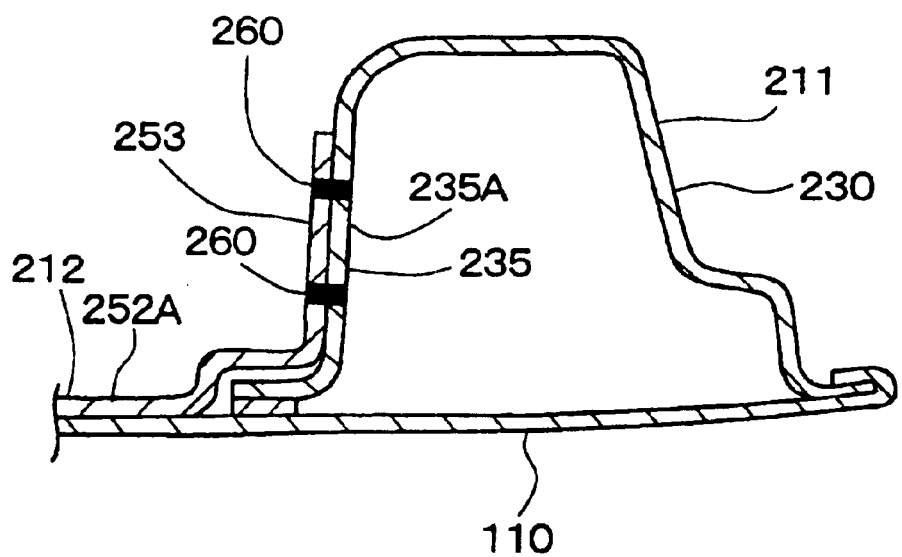
FIG. 24, which is a view including the outer panel, is a cross sectional view taken along the line S24—S24 in FIG. 24.

Next, an embodiment using an inner panel 211 shown in FIG. 22 to FIG. 24 is explained.

As shown in FIG. 22, a marginal portion 230 of the inner panel 211 in a frame shape according to this embodiment is also composed of an upper marginal portion 230A, right and left side marginal portions 230B, 230C, and a lower marginal portion 230D, and rising portions 235A in the right and left marginal portions 230B, 230C exist in a ridge portion 235, but portions corresponding to the flat surfaces 135B shown in FIG. 12, FIG. 14, and FIG. 16 do not exist. Portions corresponding to the joining pieces 153 shown in FIG. 13, FIG. 14, and FIG. 16 do not exist, either, in a reinforcing member 212 according to this embodiment as shown in FIG. 23 which is a cross sectional view taken along the line S23—S23 in FIG. 22 and which also shows the outer panel 110 connected to the inner panel 211.

Furthermore, similarly to the aforesaid embodiment, the reinforcing member 212 has a substantially C-shaped cross section with two flanges 251, 252 bending toward the outer side of the vehicle from upper and lower edge portions of a web 250 whose width direction corresponds to the vertical direction, and lips 251A, 252A are provided in the end portions of these flanges 251, 252, as shown in FIG. 22, but as shown in FIG. 24 which is a cross sectional view taken along the line S24—S24 in FIG. 22 and which also shows the outer panel 110 connected to the inner panel 211, the lip 252A has a joining piece 253 formed along the surface of the rising portion 235A of the inner panel 211 on the inner side of the vehicle, and this joining piece 253 is joined to the rising portion 235A via a welding portion 260 by spot welding. Though not shown in the drawing, a joining piece along the surface of the rising portion 235A on the inner side of the vehicle is also formed in the lip 251A, and this joining piece is also joined to the rising portion 235A via the welding portion 260 by spot welding.

Consequently, according to this embodiment, the right and left end portions of the reinforcing member 212 in a long and narrow shape which is long in the right and left direction are joined to the rising portions 235A of the inner panel 211 which are parallel or substantially parallel to the direction of opening/closing of the tailgate around the hinges 103 which are shown in FIG. 9, so that this reinforcing member 212 extends between the right and left side marginal portions 230B, 230C in the marginal portion 230 of the inner panel 211.

According to this embodiment, the reinforcing member 212 and the inner panel 211 can be joined together, making use of the rising portions 235A of the ridge portion 235 which is provided in the inner panel 211 in order to cause the tailgate to have a predetermined thickness.

Furthermore, the portions corresponding to the flat surfaces 135B shown in FIG. 12, FIG. 14, and FIG. 16 do not exist in the inner panel 211, so that, unlike the case when the flat surfaces 135B and the rising portions 135A are both provided in the inner panel as shown in FIG. 16, the inner panel 211 can be formed in a gentle shape without portions or with the small number of portions where its shape changes abruptly. As a result, impact load acts on no place or does not act on many places as stress concentration when the tailgate is opened/closed around the hinges 103, which will be an effective measure against load.

Incidentally, the above-described joining of the right and left end portions of the reinforcing member 212 to the portions parallel or substantially parallel to the opening/closing direction of the tailgate in the inner panel 211 is applicable to the case when the tailgate is manufactured through manufacturing according to two kinds of the embodiments previously described, and when the tailgate is manufactured through manufacturing according to the embodiment shown in FIG. 19 to FIG. 21 in which the reinforcing member 212 is a module member to which the door parts are attached in advance, the aforesaid joining piece of the reinforcing member 212 is joined to the rising portion 235A using a nut joined to the rising portion 235A of the inner panel 211 in advance and a bolt screwed to this nut, instead of using the welding portion 260 in FIG. 24.

Industrial Availability

As described hitherto, the vehicle door and the manufacturing method thereof according to the present invention are suitable for manufacturing a tailgate or a side door of a vehicle door with an outer panel, an inner panel and a reinforcing member.

What is claimed is:

1. A vehicle door comprising an outer panel provided on an outer side of a vehicle, an inner panel provided on an inner side of the vehicle and connected to the outer panel, the inner panel having a shape of a frame with an outer peripheral portion and an opening formed therein and a reinforcing member having at least a first extending portion extending in a right and left direction between right and left marginal portions of the inner panel, the first extending portion having a long and narrow shape which is long in a left and a right direction and end portions in a longitudinal direction which are joined to the right and left marginal portions of the inner panel respectively, a second extending portion extending downward from a central or a substantially central part of the first extending portion, and a web whose width direction corresponds to a vertical direction and a flange bending from at least one of upper and lower edge portions of the web to form a bent member.

2. The vehicle door according to claim 1, wherein said flange is provided both along the upper and lower edges of said web and these two flanges are formed continuously along the longitudinal direction of said web.

3. The vehicle door according to claim 2, wherein, in said reinforcing member composed of said web and said two flanges to form the bent member with a substantially C-shaped cross section, an opening portion of the substantially C-shaped cross section faces the outer side of the vehicle and each of the end portions in the longitudinal direction is joined to a surface of the inner panel on said inner side of the vehicle.

4. The vehicle door according to claim 1, wherein door parts are attached to said reinforcing member.

5. The vehicle door according to claim 4, wherein, a wiper motor, an outer handle, and a key cylinder are attached to the reinforcing member, and a door lock is attached to said inner panel.

6. The vehicle door according to claim 1, wherein an outer handle is attached to said reinforcing member.

7. The vehicle door according to claim 1, wherein the vehicle door is a tailgate.

8. A vehicle door comprising an outer panel provided on an outer side of a vehicle, an inner panel provided on an inner side of the vehicle and connected to the outer panel, the inner panel having a shape of a frame with an outer peripheral portion and an opening formed therein and a reinforcing member having at least a first extending portion extending in a right and left direction between right and left marginal portions of the inner panel, wherein a joining portion of the outer panel, inner panel and reinforcing member has a cross section in the shape of a box and a peripheral portion of the outer panel is joined to a surface of a marginal portion of the inner panel, which has a hat-shaped cross section opening toward an outer side of the vehicle, on the outer side of the vehicle and end portions of the reinforcing member are joined to a surface of the outer peripheral portion of the inner panel on the inner side of the vehicle.

9. A vehicle door comprising an outer panel provided on an outer side of a vehicle and an inner panel provided on an inner side of the vehicle and connected to the outer panel, the inner panel having a shape of a frame with an outer peripheral portion and an opening formed therein, wherein a hat-shaped portion having a hat-shaped cross section is formed along the outer peripheral portion of the inner panel and a box-shaped portion having a box-shaped cross-section is formed along a whole periphery of the door by connecting the inner and outer panels.

10. A vehicle door comprising an outer panel provided on an outer side of a vehicle and an inner panel provided on an inner side of the vehicle and connected to the outer panel, the inner panel being formed of a tailored blank which is formed by joining a plurality of blank materials, including blank materials having different plate thicknesses and having a shape of a frame with an outer peripheral portion and an opening formed therein.

11. The vehicle door according to claim 10, wherein said tailored blank is made up of a blank material forming a hinge attaching portion to which a door hinge is attached and a blank material forming a portion other than this hinge attaching portion, and the blank material forming said hinge attaching portion has a plate thickness larger than the blank material forming the portion other than said hinge attaching portion.

12. The vehicle door according to claim 11, wherein at least a part of the portion other than said hinge attaching portion is formed by joining a plurality of blank materials having an equal plate thickness.

13. The vehicle door according to claim 12, wherein the portion formed by joining the plural blank materials having the equal plate thickness is a bending portion.

* * * * *